United States Patent [19]
Greenspan et al.

[11] Patent Number: 6,128,710
[45] Date of Patent: Oct. 3, 2000

[54] METHOD UTILIZING A SET OF BLOCKING-SYMBOL RESOURCE-MANIPULATION INSTRUCTIONS FOR PROTECTING THE INTEGRITY OF DATA IN NONCONTIGUOUS DATA OBJECTS OF RESOURCES IN A SHARED MEMORY OF A MULTIPLE PROCESSOR COMPUTER SYSTEM

[75] Inventors: Steven Jay Greenspan, Hyde Park; Kenneth Ernest Plambeck; Casper Anthony Scalzi, both of Poughkeepsie, all of N.Y.

[73] Assignee: International Business Machines Corporation, Armonk, N.Y.

[21] Appl. No.: 09/092,442

[22] Filed: Jun. 5, 1998

Related U.S. Application Data

[63] Continuation-in-part of application No. 08/864,402, May 28, 1997, Pat. No. 5,893,157, and a continuation-in-part of application No. 08/864,585, May 28, 1997, Pat. No. 5,895,492.

[51] Int. Cl.[7] .................................................. G06F 9/30
[52] U.S. Cl. ........................ 711/152; 711/150; 712/220
[58] Field of Search ................................... 711/150, 152, 711/154; 712/225, 220

[56] References Cited

U.S. PATENT DOCUMENTS

| | | | |
|---|---|---|---|
| 5,428,761 | 6/1995 | Herlihy et al. ................... | 711/130 |
| 5,701,501 | 12/1997 | Gandhi ................................... | 712/203 |
| 5,742,785 | 4/1998 | Stone et al. ............................ | 712/217 |

*Primary Examiner*—Kenneth S. Kim
*Attorney, Agent, or Firm*—Marc A. Ehrlich; Bernard M. Goldman; Floyd A. Gonzalez

[57] ABSTRACT

Six instructions for the manipulation of discontinuous memory locations in a computer memory are described. They are: Compare and Load (CL), Compare and Swap (CS), Double Compare and Swap (DCS), Compare and Swap and Store (CSST), Compare and Swap and Double Store (CSDST), and Compare and Swap and Triple Store (CSTST). In each instruction a processor associates a programming-specified blocking symbol with a lock not accessible to software. The lock is used by any of these instructions only during its single instance of instruction execution, and the lock is made available (unlocked) at the end of each instance to then enable another blocking-symbol instruction instance to use the lock, thereby serializing concurrent multiple processor requests for accessing the same resource. Programming associates resources in a system with the unique blocking symbols. Each instance of these instructions executes an operand earlier prepared from a data value taken from the resource.. The data value is checked for change during the instance of execution when equality indicates no change since its preparation. These blocking-symbol instructions significantly increase the computer's speed of changing noncontiguous locations in a resource, compared to the time needed by software-protocol locks which must operate over a plurality of instances to make corresponding changes in a resource.

15 Claims, 20 Drawing Sheets

FIGURE 1A (PLO INSTRUCTION GENERAL FORMAT)
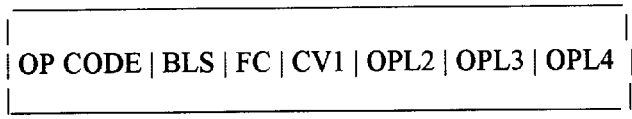
FIGURE 1A(1)
| OPERAND |
| LIST |
| (ADDRESSED |
| BY OPL4 IN |
| FIGURE 1A) |
FIGURE 1B (PLO COMPARE AND LOAD, CL)
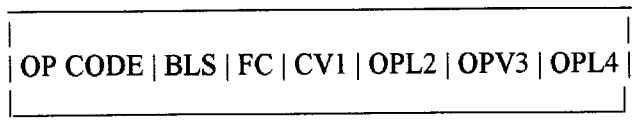
FIGURE 1C (PLO COMPARE AND SWAP, CS)
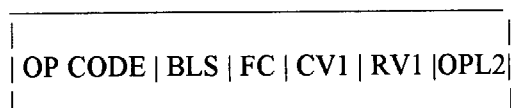
FIGURE 1D (PLO DOUBLE COMPARE AND SWAP, DCS)
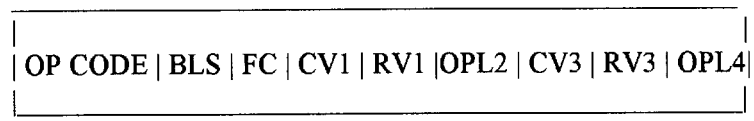
FIGURE 1E (PLO COMPARE AND SWAP AND STORE, CSST)
FIGURE 1F (PLO COMPARE AND SWAP AND DOUBLE STORE, CSDST)
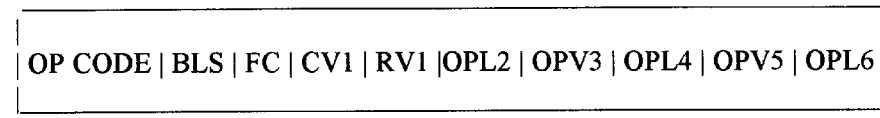
FIGURE 1G (PLO COMPARE AND SWAP AND TRIPLE STORE, CSTST)
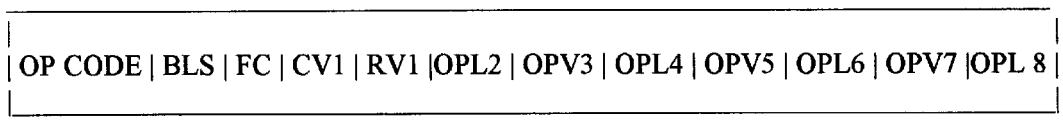

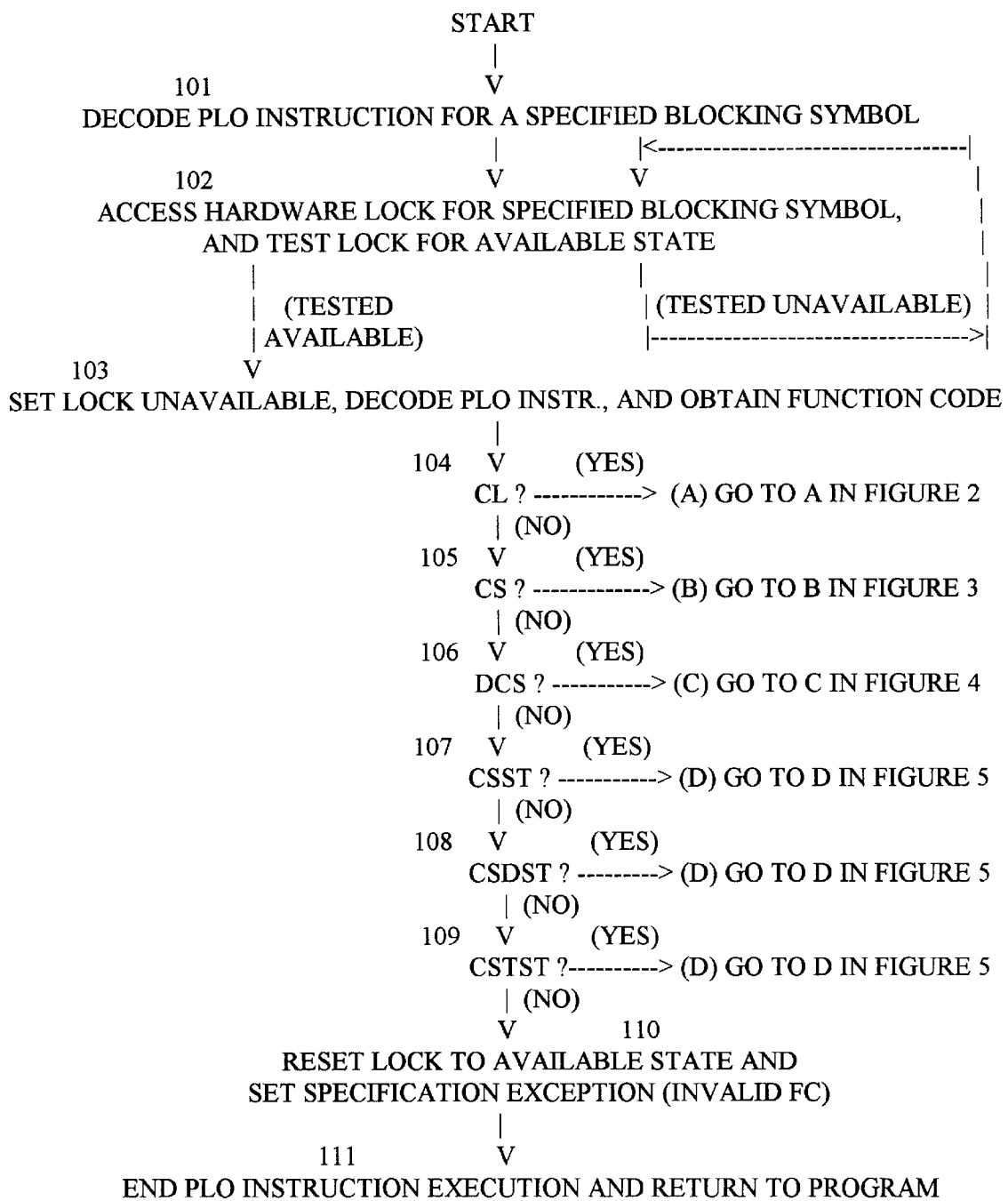

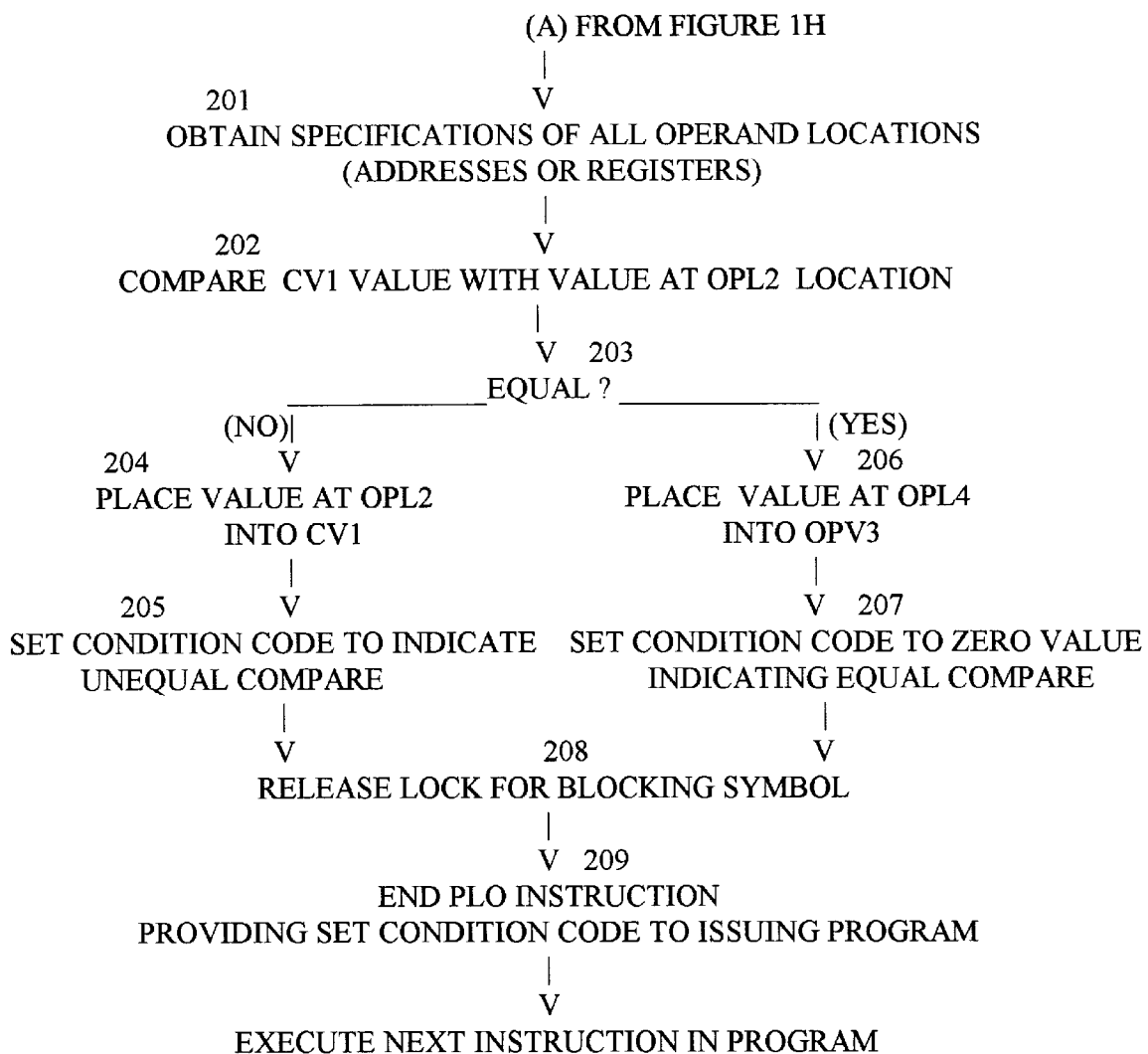

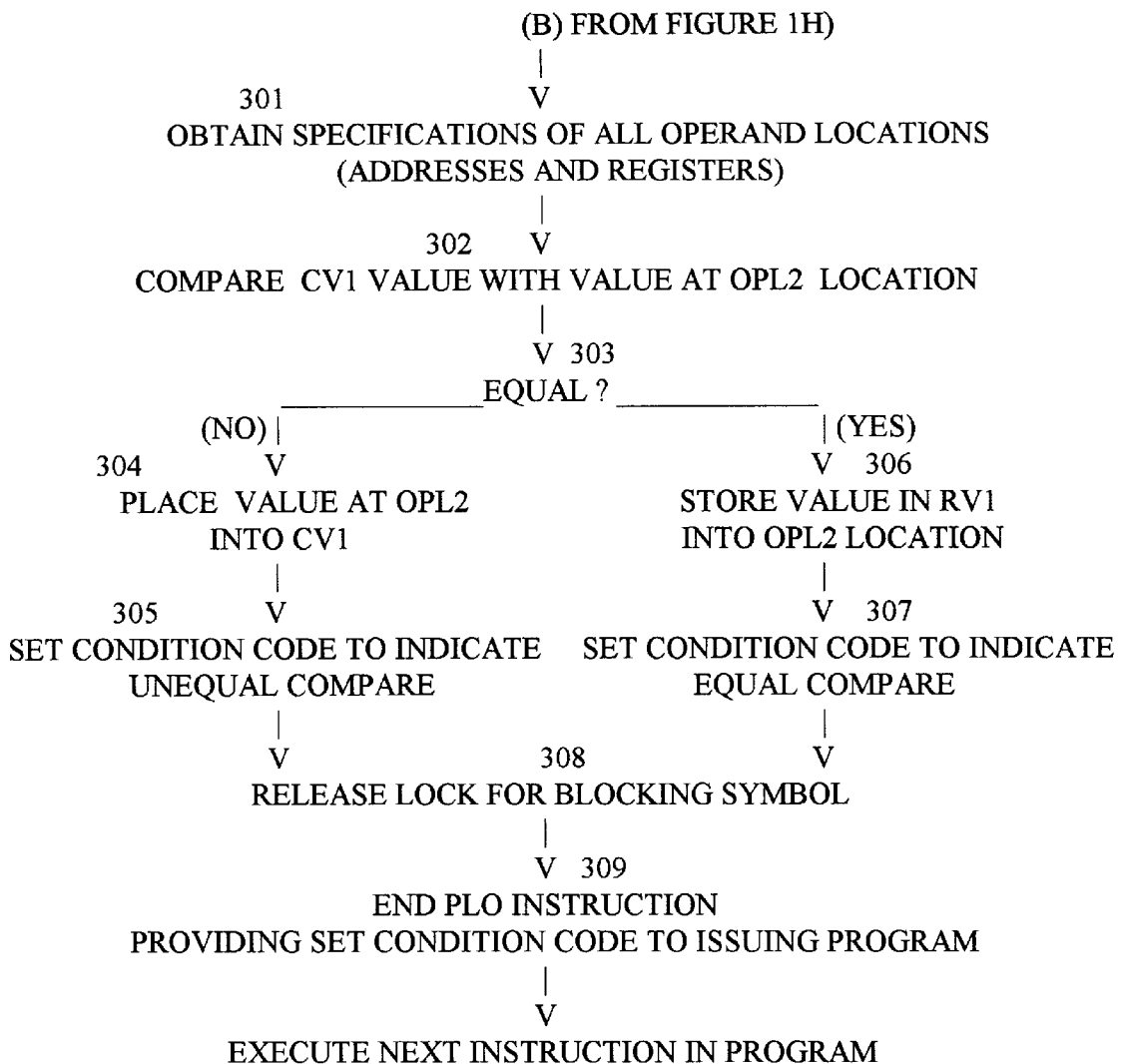
FIGURE 3 (COMPARE & SWAP, CS)

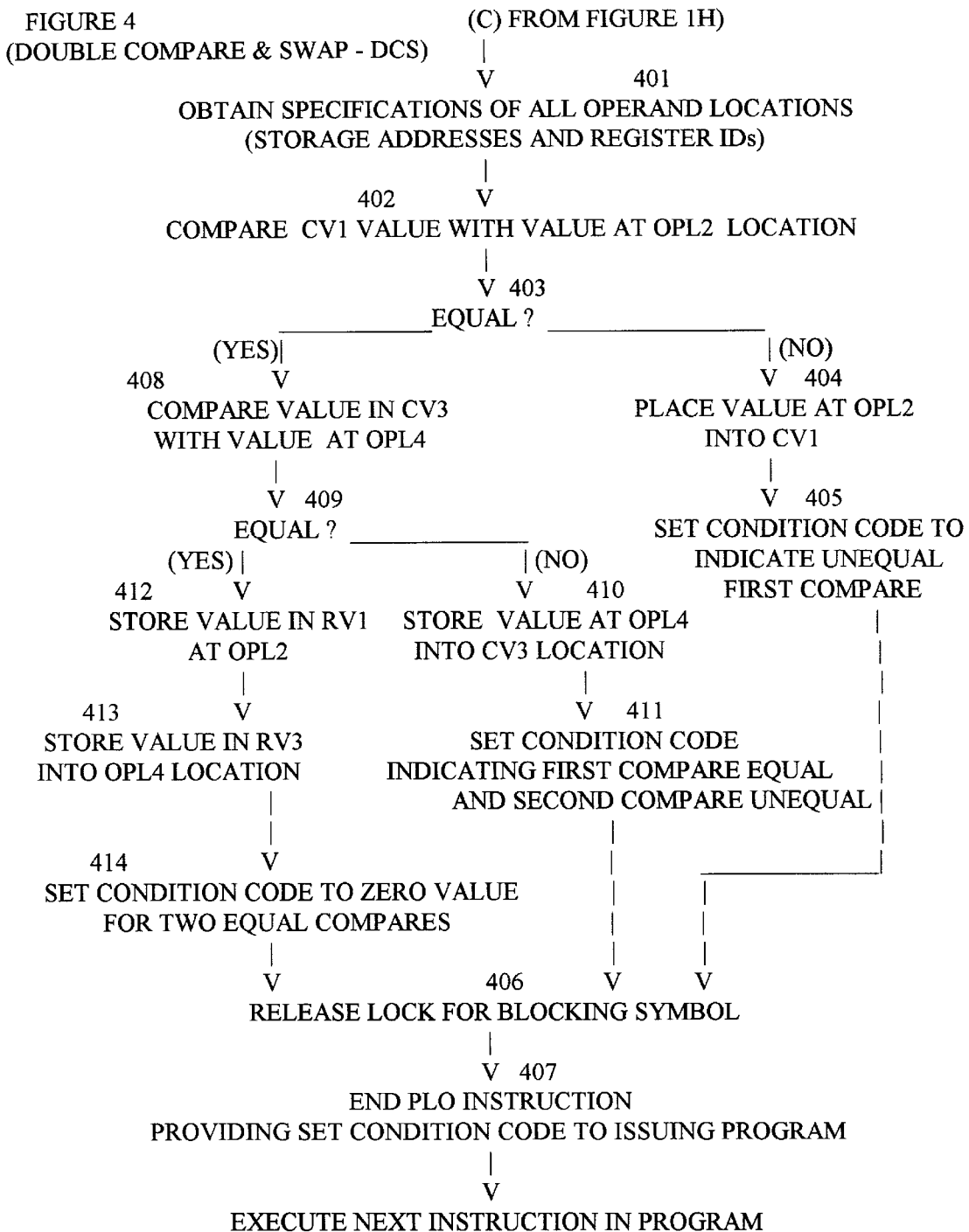

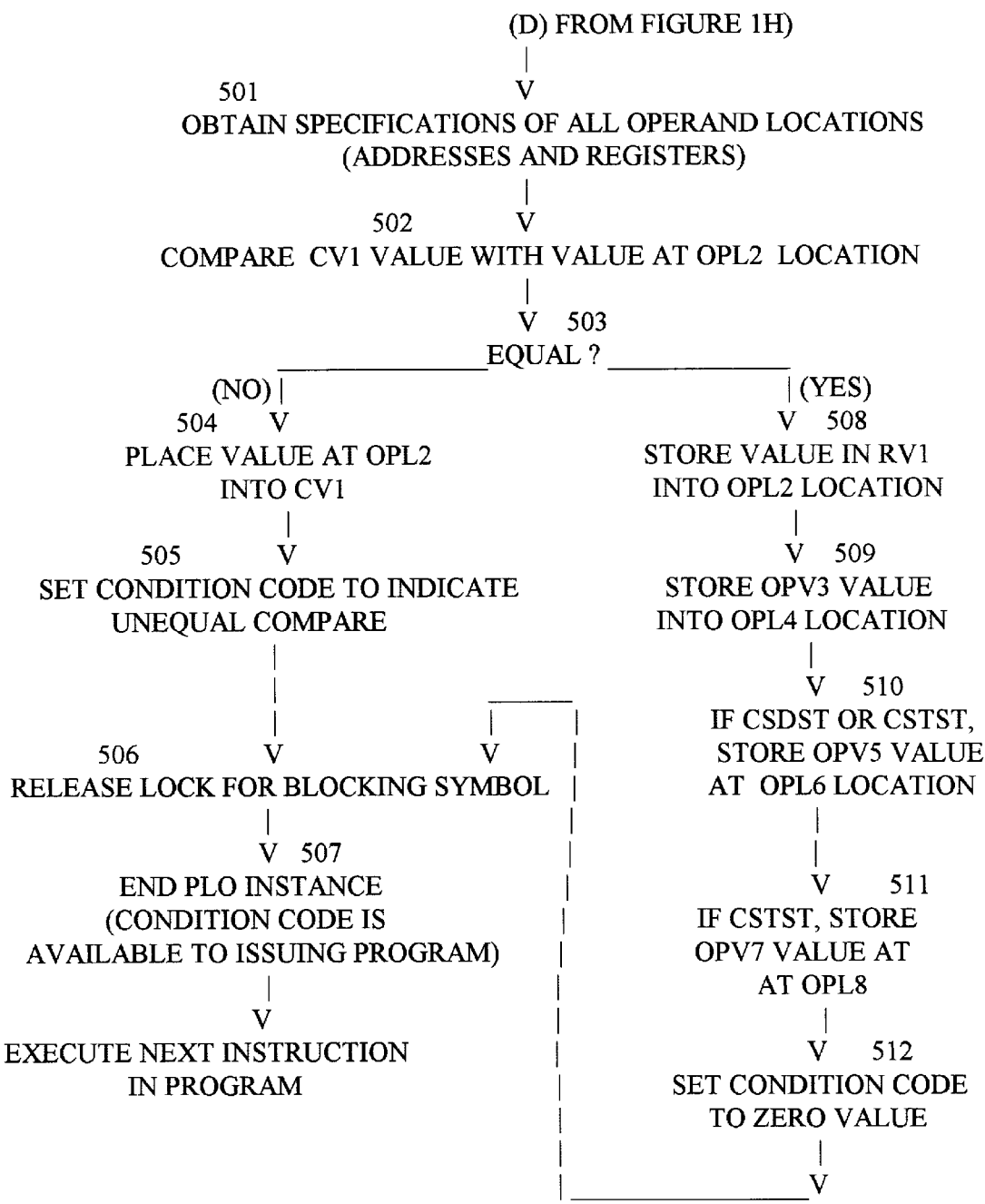

(COMPARE & LOAD, CL, EXAMPLE)

FIGURE 6B (QUEUE)
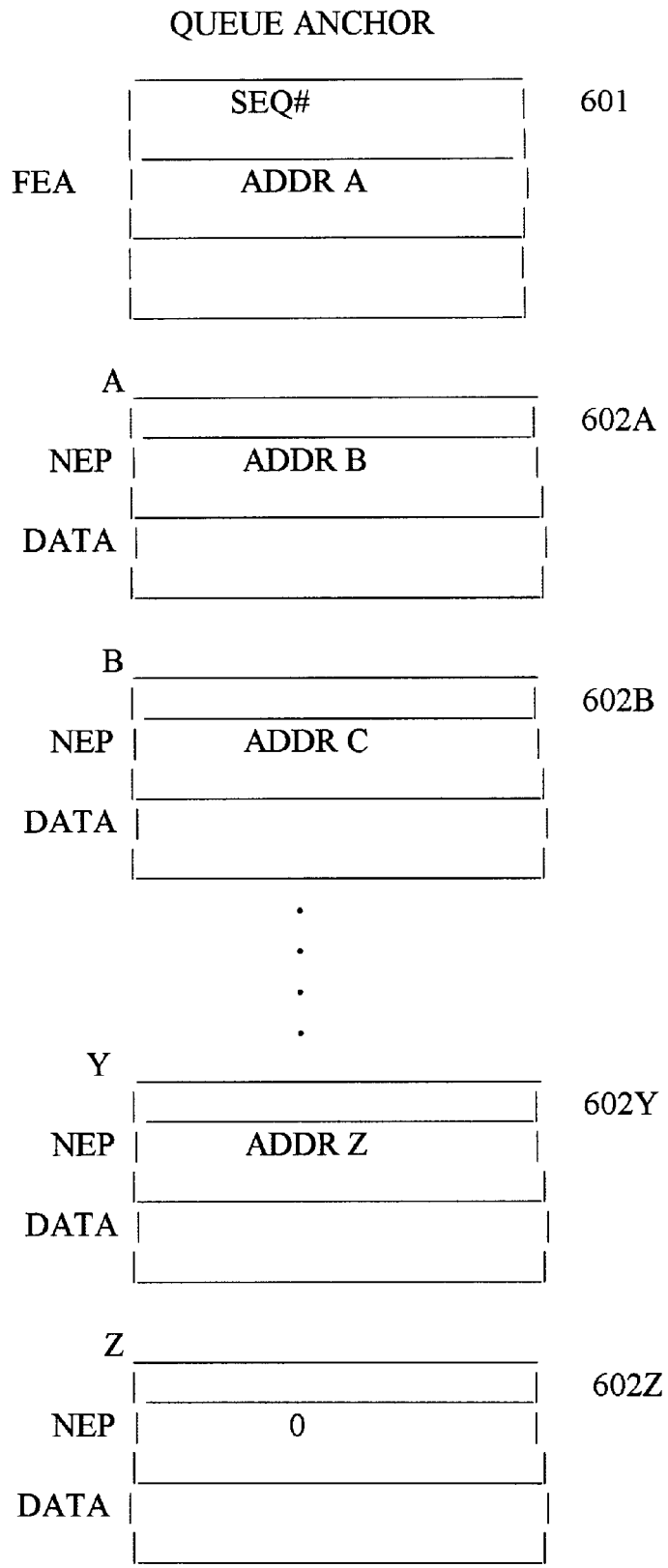

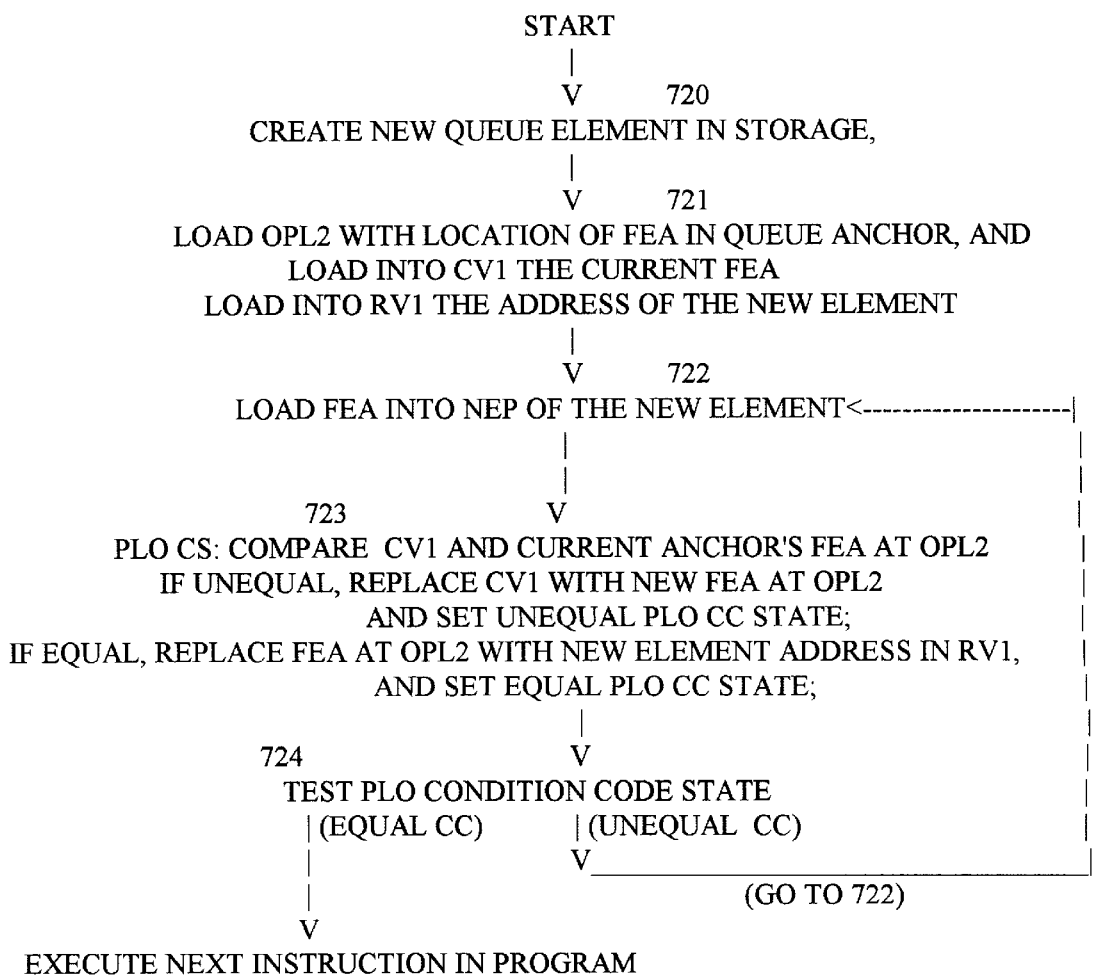
FIGURE 7A (COMPARE & SWAP EXAMPLE)

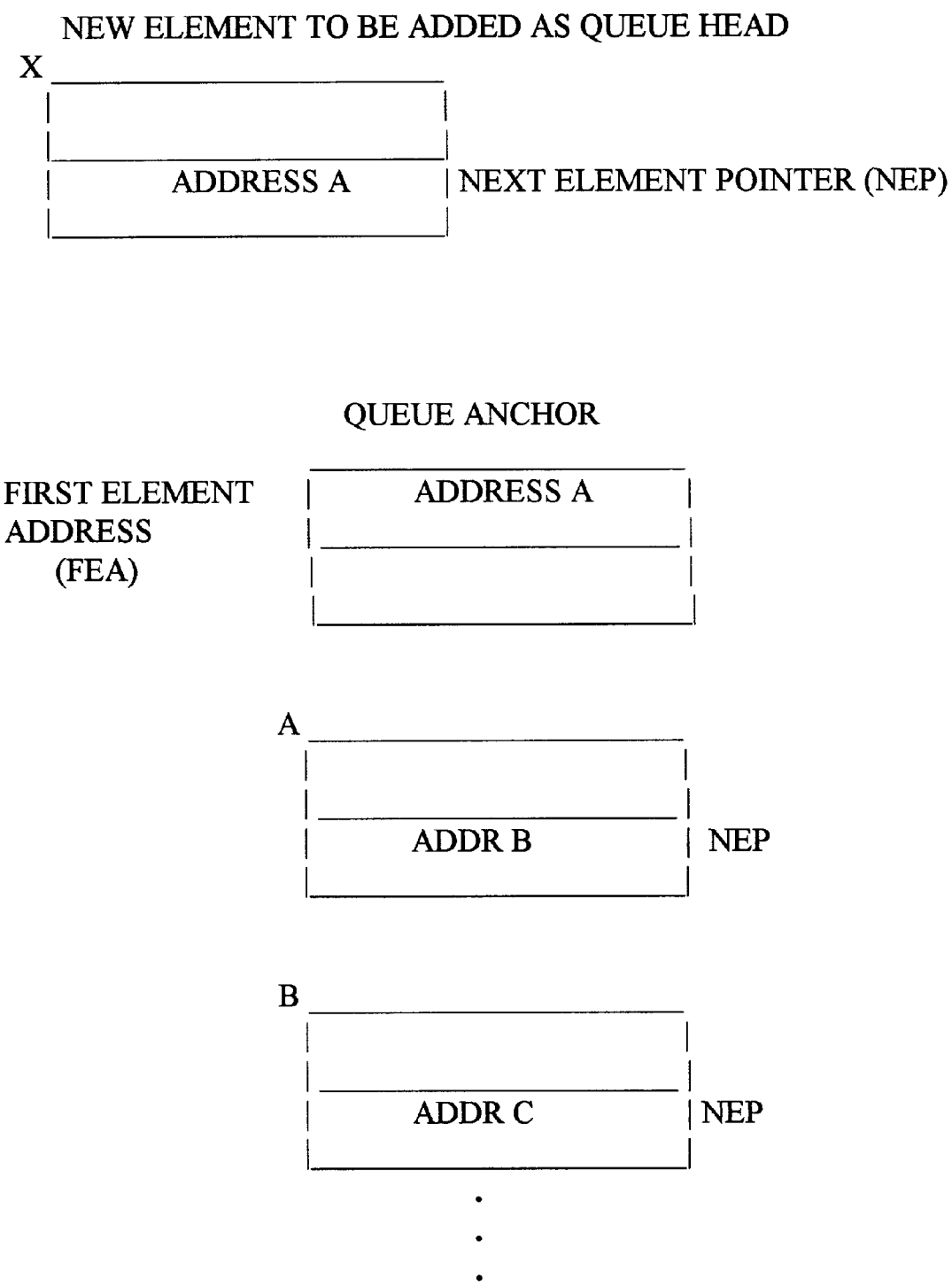
FIGURE 7B (COMPARE & SWAP QUEUE EXAMPLE)

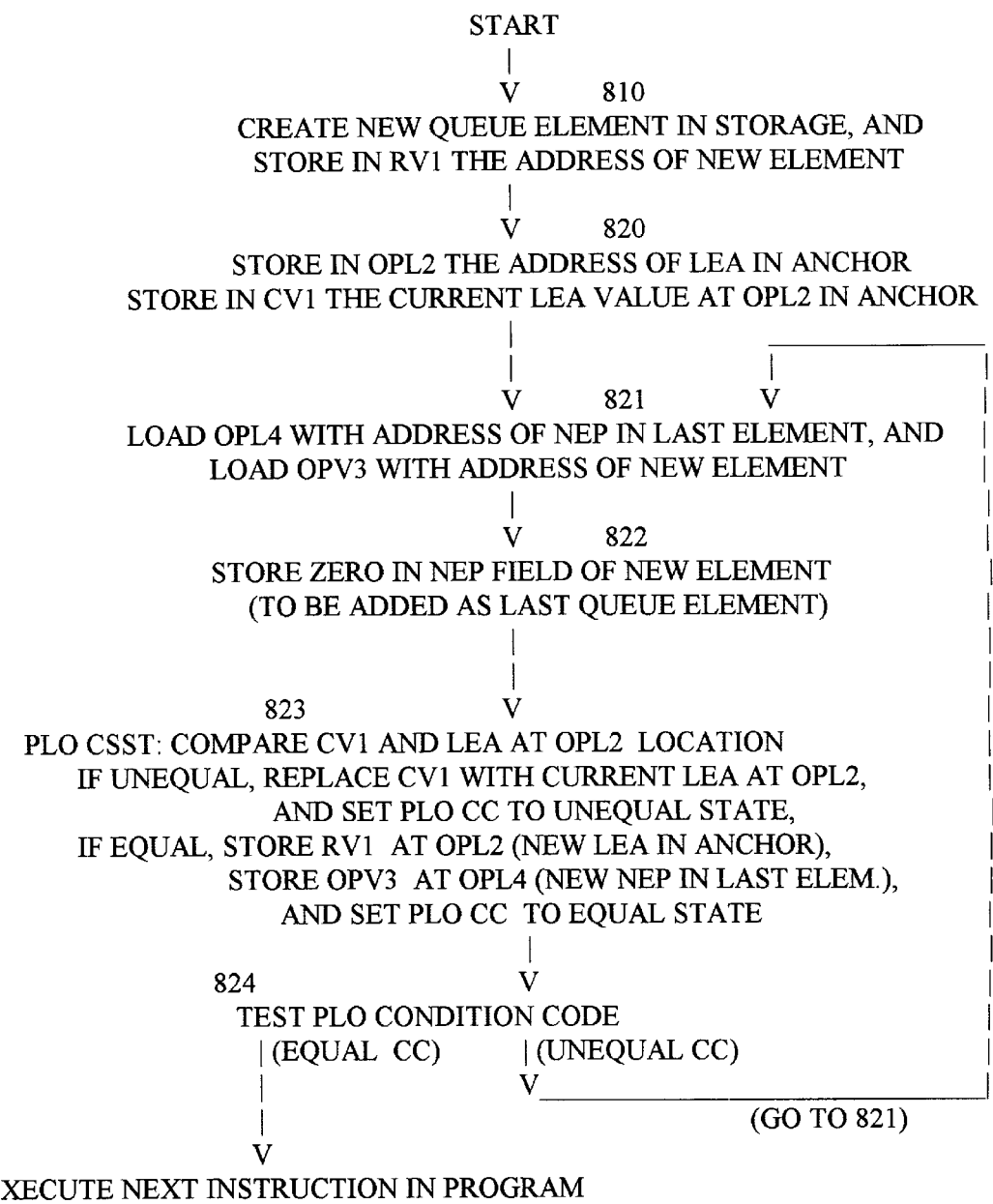
FIGURE 8A (COMPARE AND SWAP AND STORE EXAMPLE, NEW ELEMENT TO BE ADDED AT TAIL OF QUEUE)

FIGURE 8B (COMPARE & SWAP & STORE QUEUE EXAMPLE)
NEW ELEMENT TO BE ADDED AS LAST QUEUE ELEMENT
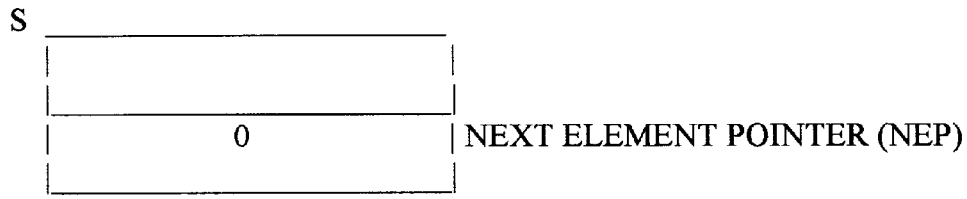
QUEUE ANCHOR
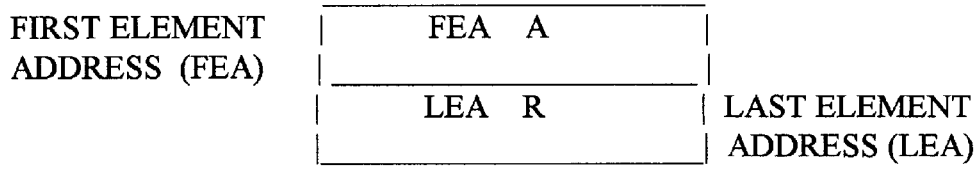
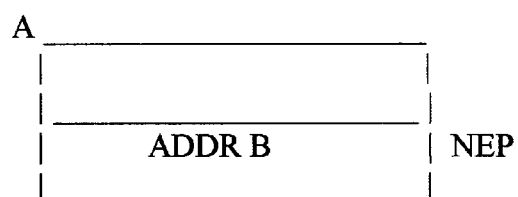
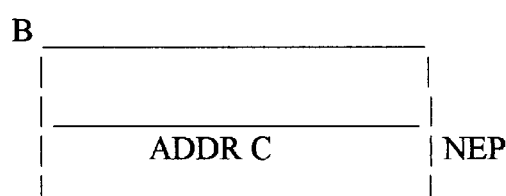
.
.
.
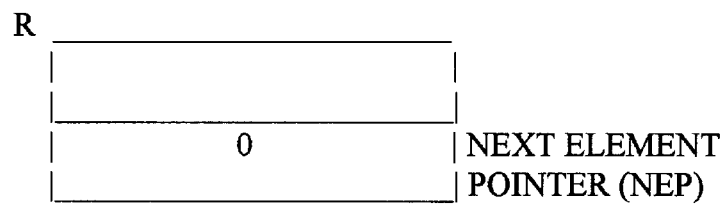

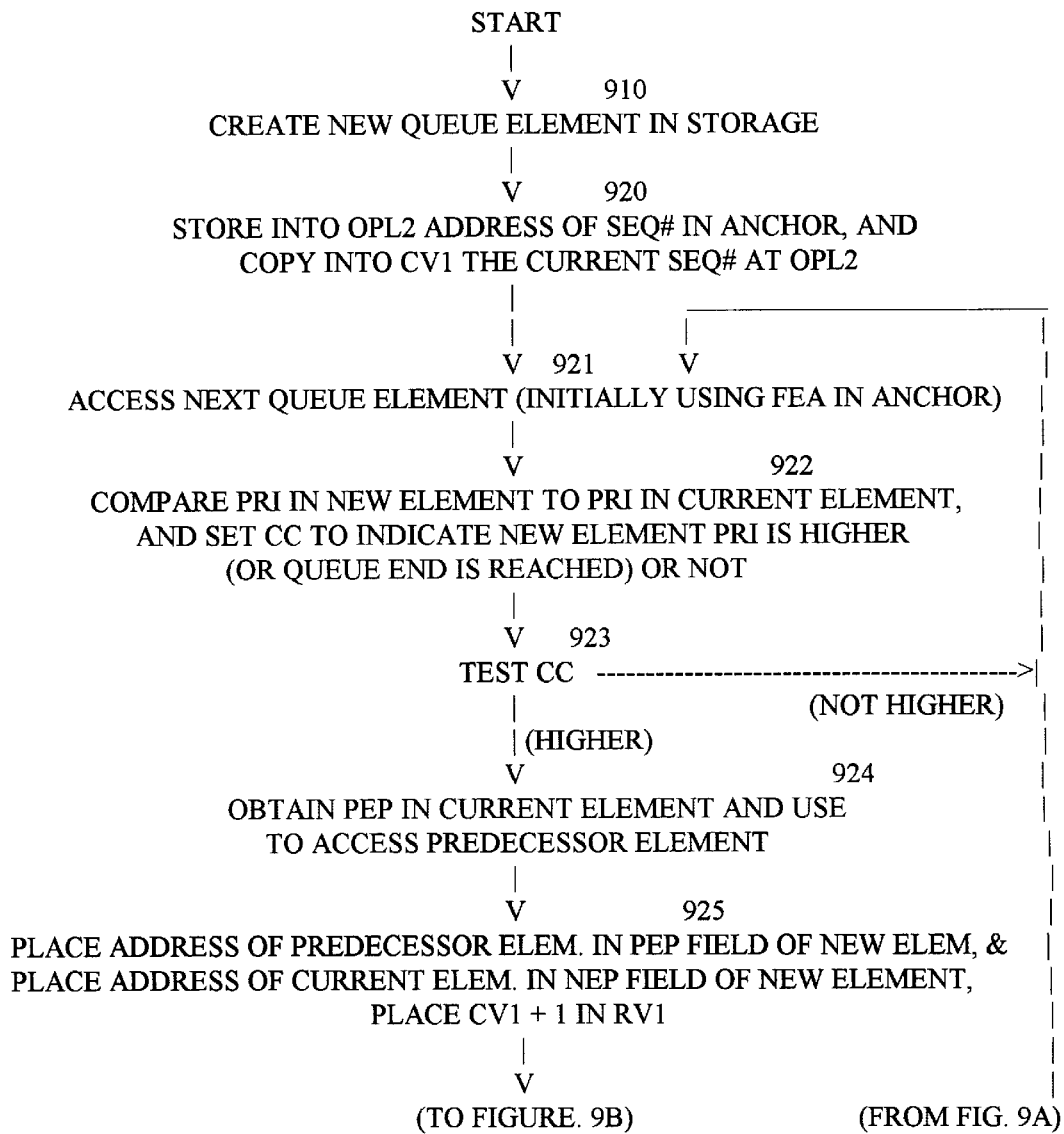

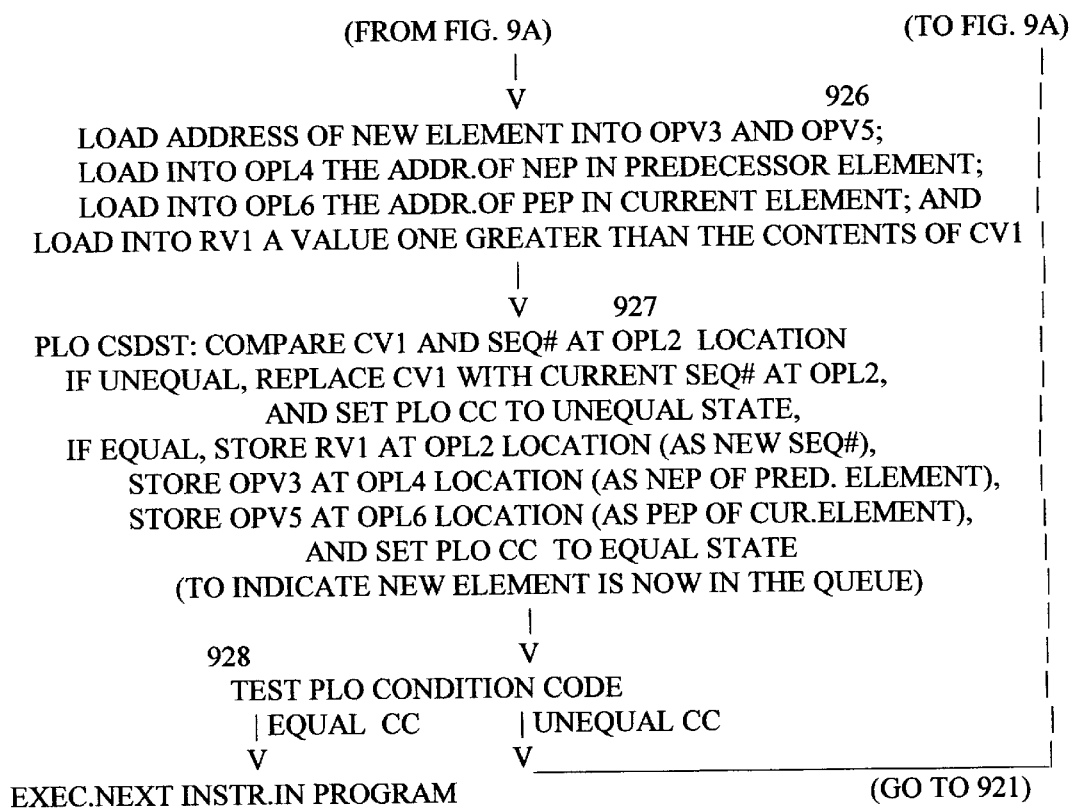
FIGURE 9B (CONTINUATION OF CSDST EXAMPLE)

FIGURE 9C (COMPARE & SWAP & DOUBLE STORE EXAMPLE,
NEW ELEMENT TO BE ADDED IN PRIORITY ORDER)
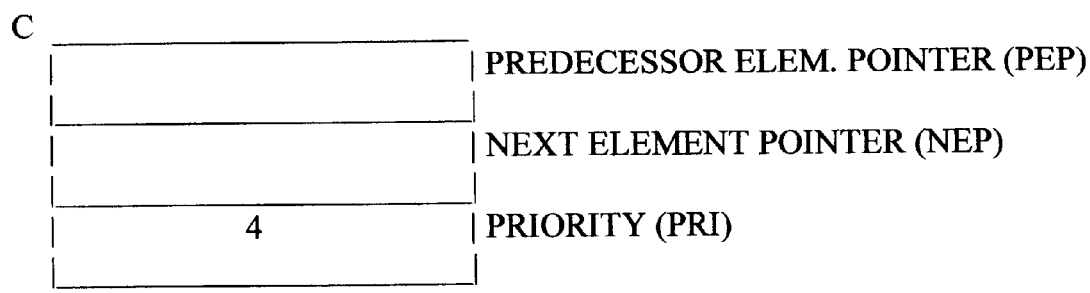
```
C  _____
   |                      | PREDECESSOR ELEM. POINTER (PEP)
   |_____|
   |                      | NEXT ELEMENT POINTER (NEP)
   |_____|
   |          4           | PRIORITY (PRI)
   |_____|
```
```
                QUEUE ANCHOR
                                       FIRST ELEMENT
        _____         ADDRESS (FEA)
 900   |        FEA A        |
       |_____|
       |                     |         LAST ELEMENT
       |        LEA E        |         ADDRESS (LEA)
       |_____|
       |        SEQ#         |
       |_____|         SEQUENCE #
```
```
        A  _____
 901      |          0          | PEP
          |_____|
          |          B          | NEP
          |_____|
          |          1          | PRI
          |_____|
        B  _____
 902      |          A          | PEP
          |_____|
          |          D          | NEP
          |_____|
          |          3          | PRI
          |_____|
        D  _____
 903      |          B          | PEP
          |_____|
          |          E          | NEP
          |_____|
          |          5          | PRI
          |_____|
        E  _____
 904      |          D          | PEP
          |_____|
          |          0          | NEP
          |_____|
          |          7          | PRI
          |_____|
```

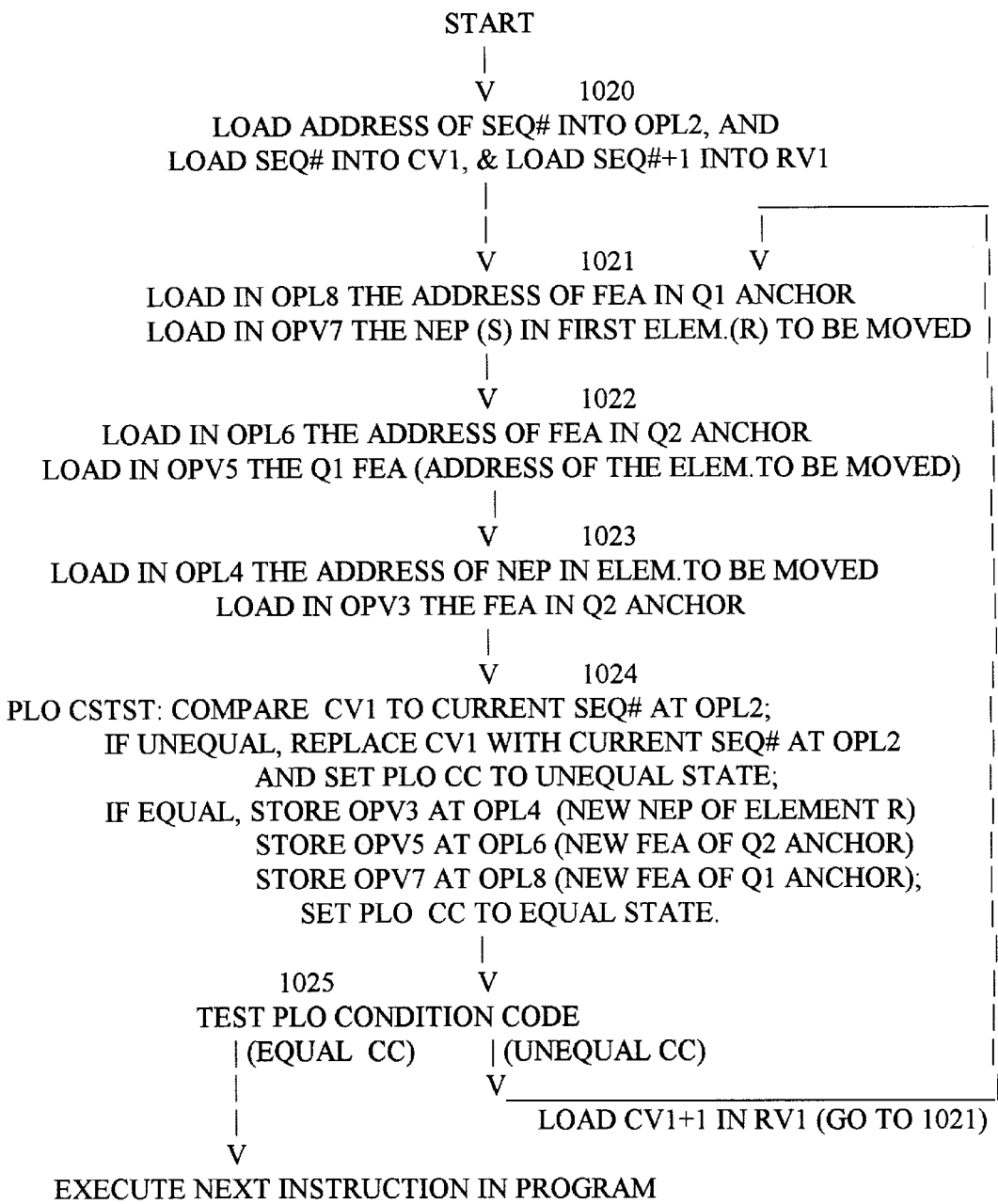
FIGURE 10A (COMPARE & SWAP & TRIPLE STORE - EXAMPLE)

FIGURE 10B (COMPARE & SWAP & TRIPLE STORE - EXAMPLE CONTINUED)
EXAMPLE: ASSUMING QUEUE Q1 AND QUEUE Q2 ARE NOT EMPTY,
MOVE ATOMICALLY THE TOP ELEMENT OF
ONE QUEUE TO BE THE TOP ELEMENT OF
ANOTHER QUEUE, WHERE THE TWO Q's SHARE
A SEQ# WHICH IS INCREMENTED WHEN
EITHER QUEUE IS CHANGED.
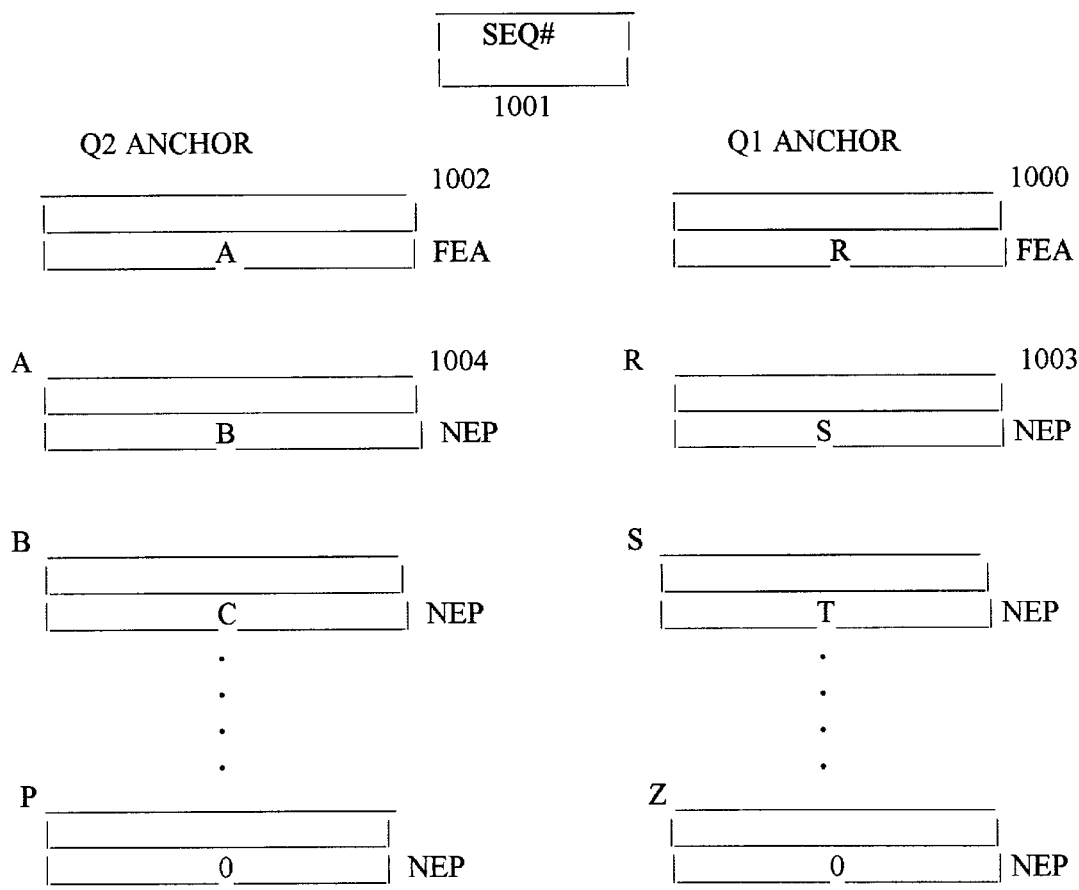

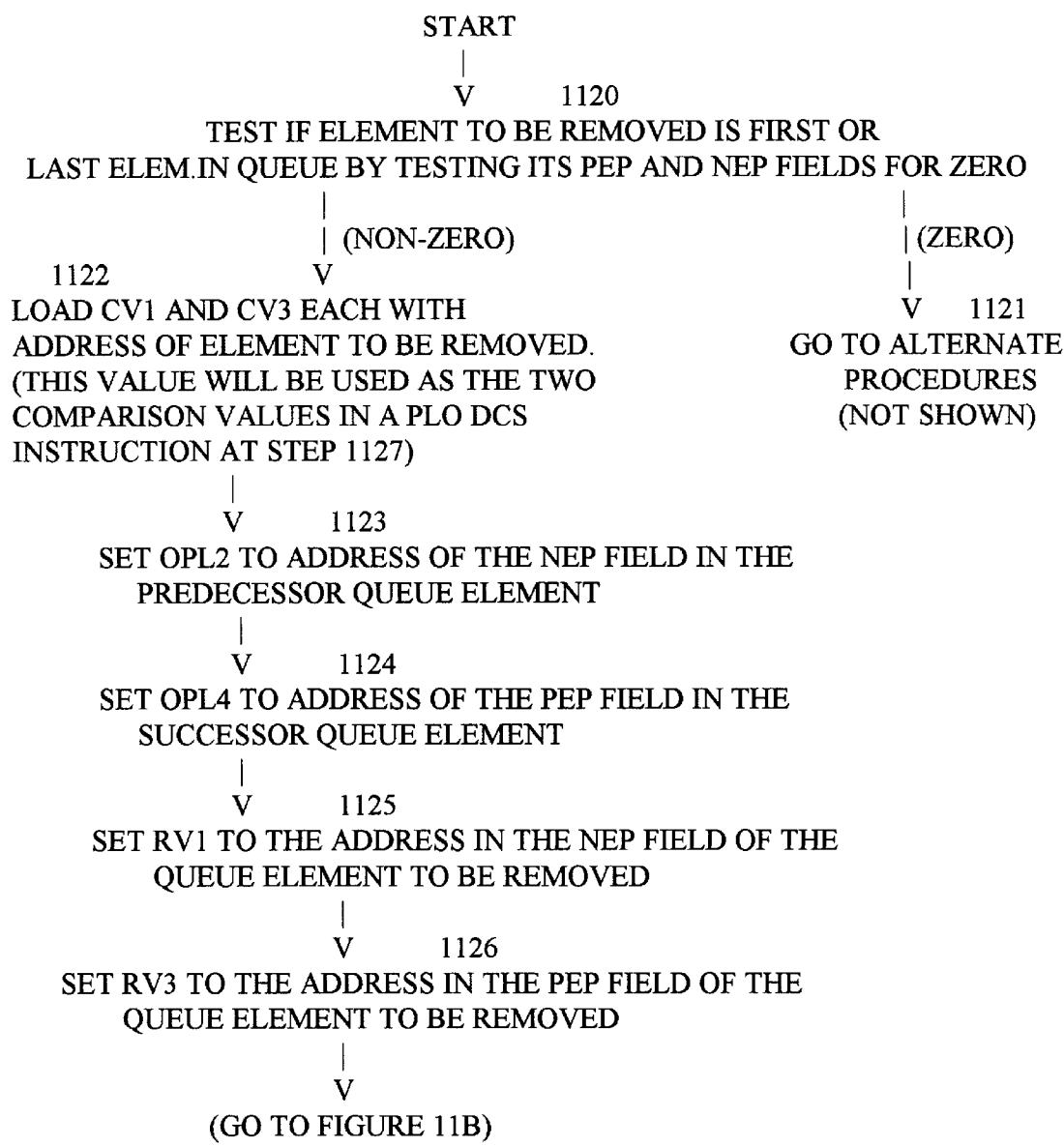

FIGURE 11A (DOUBLE COMPARE & SWAP- EXAMPLE)
(REMOVE AN ELEMENT FROM A QUEUE WHERE EACH ELEMENT
CONTAINS THE ADDRESS OF ITS PREDECESSOR ELEMENT AND
THE NEXT ELEMENT IN THE QUEUE, WHERE THE ELEMENT TO BE
REMOVED IS NOT THE FIRST ELEMENT)

```
                            START
                              |
                              V    1120
              TEST IF ELEMENT TO BE REMOVED IS FIRST OR
         LAST ELEM.IN QUEUE BY TESTING ITS PEP AND NEP FIELDS FOR ZERO
                              |                              |
                    | (NON-ZERO)                             |(ZERO)
         1122       V                                        |
         LOAD CV1 AND CV3 EACH WITH                          V    1121
         ADDRESS OF ELEMENT TO BE REMOVED.            GO TO ALTERNATE
         (THIS VALUE WILL BE USED AS THE TWO              PROCEDURES
         COMPARISON VALUES IN A PLO DCS                   (NOT SHOWN)
         INSTRUCTION AT STEP 1127)
                              |
                              V    1123
              SET OPL2 TO ADDRESS OF THE NEP FIELD IN THE
                    PREDECESSOR QUEUE ELEMENT
                              |
                              V    1124
              SET OPL4 TO ADDRESS OF THE PEP FIELD IN THE
                     SUCCESSOR QUEUE ELEMENT
                              |
                              V    1125
              SET RV1 TO THE ADDRESS IN THE NEP FIELD OF THE
                     QUEUE ELEMENT TO BE REMOVED
                              |
                              V    1126
              SET RV3 TO THE ADDRESS IN THE PEP FIELD OF THE
                     QUEUE ELEMENT TO BE REMOVED
                              |
                              V
                       (GO TO FIGURE 11B)
```

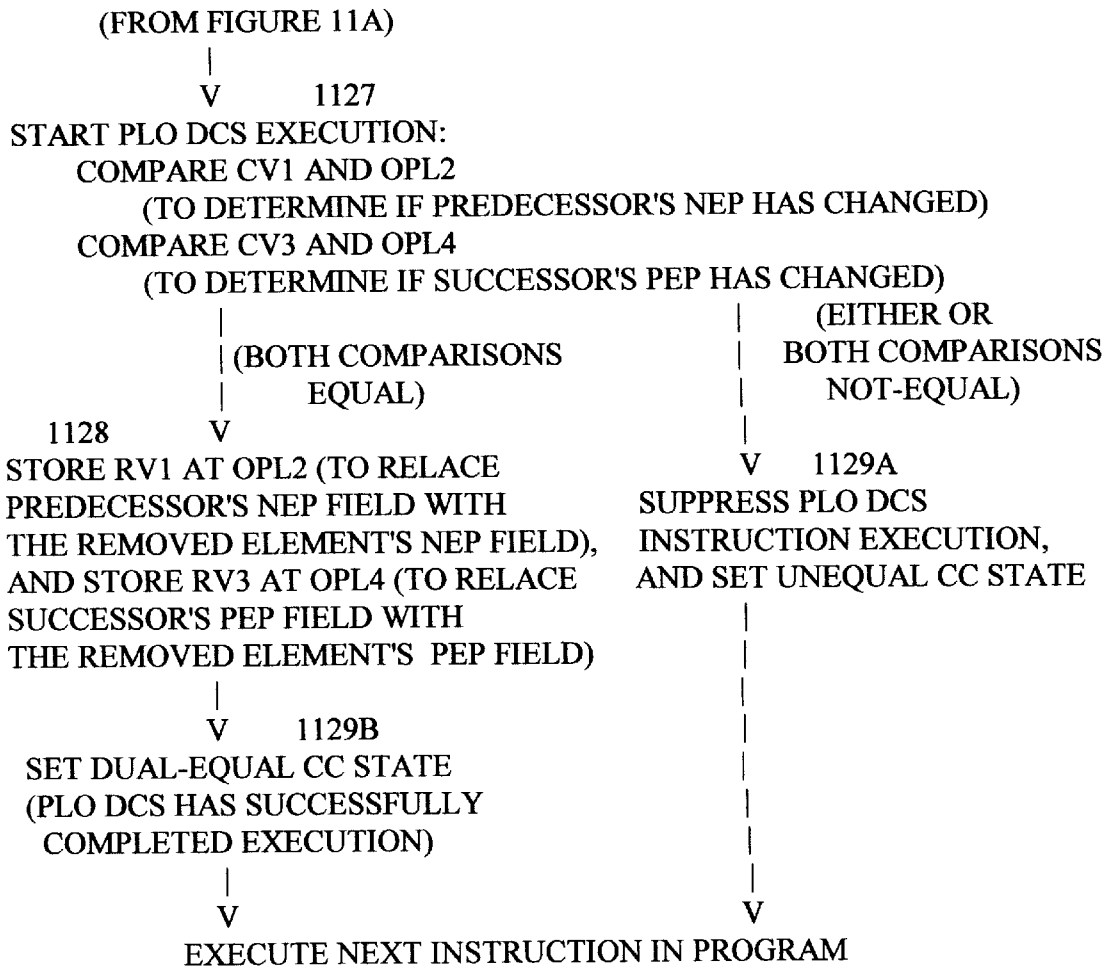
FIGURE 11B (DOUBLE COMPARE & SWAP- EXAMPLE CONTINUED)

FIGURE 11C (DOUBLE COMPARE & SWAP- DCS EXAMPLE CONTINUED)
TO REMOVE ELEMENT C:
    B's NEP TO RECEIVE "D"
    D's PEP TO RECEIVE "B"
        IF
  B's NEP = C, AND
  D's PEP = C
  WHEN PLO DCS INSTRUCTION EXECUTES
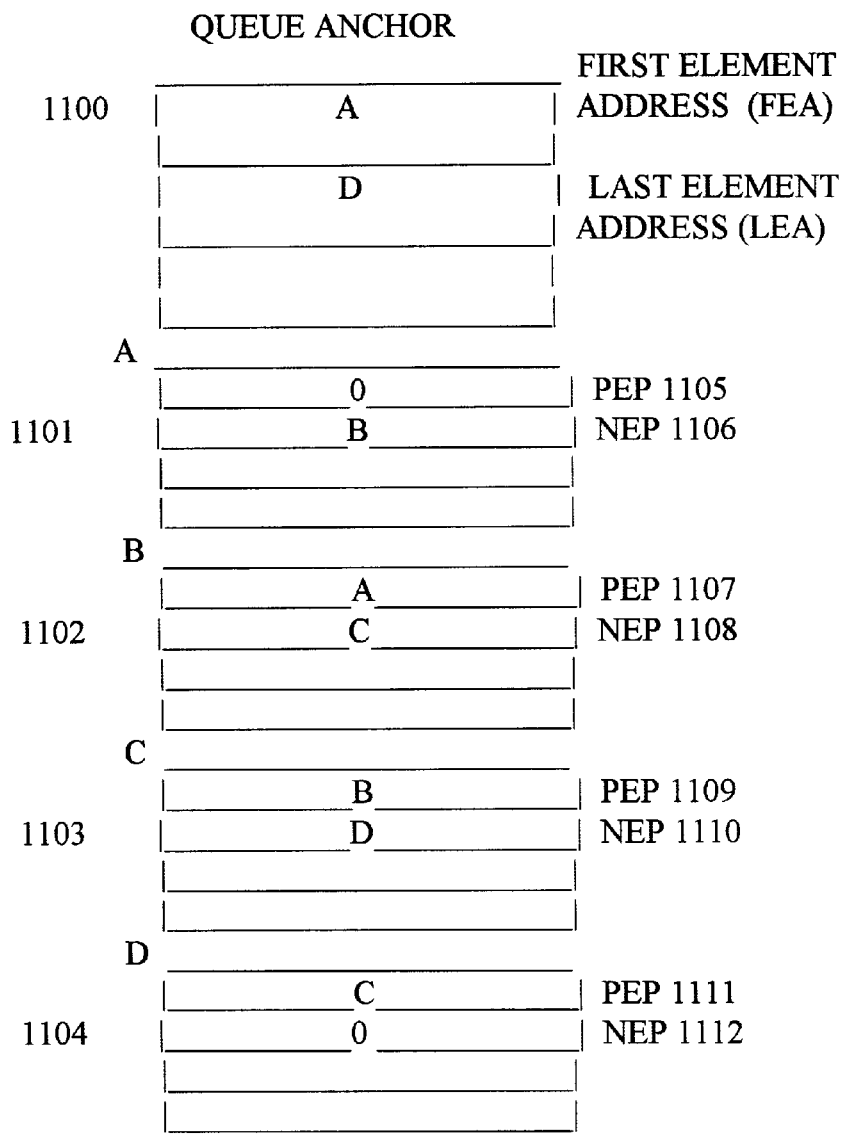

METHOD UTILIZING A SET OF BLOCKING-SYMBOL RESOURCE-MANIPULATION INSTRUCTIONS FOR PROTECTING THE INTEGRITY OF DATA IN NONCONTIGUOUS DATA OBJECTS OF RESOURCES IN A SHARED MEMORY OF A MULTIPLE PROCESSOR COMPUTER SYSTEM

This application is a continuation-in-part of application Ser. No. 08/864,402, now U.S. Pat. No. 5,893,157, (PO996083) entitled "Blocking Symbol Control in a Computer System to Serialize Accessing a Data Resource by Simultaneous Processor Requests", filed on May 28, 1997 by the inventors of the subject application, and of application Ser. No. 08/864,585, now U.S. Pat. No. 5,895,492, (PO997053) entitled "Processor Associated Blocking Symbol Controls for Serializing the Accessing of Data Resources in a Computer System", both filed May 28, 1997.

INTRODUCTION

This invention relates to new Perform Locked Operation (PLO) instructions for maintaining the integrity of data in a shared memory computer having more than one processor. A particular use for this PLO invention is to maintain the integrity of queues of data elements in storage while they are being changed at multiple disjoint, noncontiguous locations by a single PLO instruction instance of execution on any processor in a computer system.

INCORPORATION BY REFERENCE

This application incorporates by reference the entire content of each of the following applications which teach different processes for executing PLO instruction instances:

1) Ser. No.08/864,402 (PO996083) filed May 28, 1997, now issued U.S. Pat. No. 5,893,157, entitled "Blocking Symbol Control in a Computer System to Serialize Accessing a Data Resource by Simultaneous Processor Requests", filed on May 28, 1997 by the inventors of the subject application.

2) Ser. No. 08/864,585 (PO997053) filed May 28, 1997, now issued U.S. Pat. No. 5,895,492, entitled "Processor Associated Blocking Symbol Controls for Serializing the Accessing of Data Resources in a Computer System" filed on May 28, 1997 by the inventors of the subject application.

3) Application Ser. No. 08/924,890 (PO997054), now issued U.S. Pat. No. 5,895,494, entitled "A Method of Executing Perform Locked Operation Instructions for Supporting Recovery of Data Consistency if Lost Due to Processor Failure, and a Method of Recovering the Data Consistency After Processor Failure" filed Sep. 5, 1997 by the inventors of the subject application.

In more detail, application Ser. No. 08/864,402 (PO996083), of which this application is a continuation-in-part, teaches how a processor associates a blocking symbol with a hardware lock entry which is not visible to, or addressable by, the program executing the PLO instruction instance from which the blocking symbol is obtained. A preferred embodiment in the application provides a blocking symbol/lock entry association by the processor hashing the blocking symbol obtained from a PLO instruction instance to locate the associated lock entry in a protected storage not addressable by software. A software protocol in the system selects the blocking symbols and uniquely associates them with the respective storage resources in the system, and the hardware locks have no knowledge of the association of blocking symbols to resources. The binding of a blocking symbol to a hardware lock is done dynamically during the execution of a PLO instruction using a specific blocking symbol) after it checks and finds no hardware lock currently is associated with the blocking symbol. If a PLO instruction instance finds a hardware lock for the blocking symbol in a busy state, the PLO must wait until it finds the lock in an available state, which happens at the end of each PLO instance using the lock. When plural PLO instances are concurrently being executed by different processors using the same blocking symbol, the processors independently serialize their accessing of the same resource by their testing of the hardware lock associated with the blocking symbol. Thus, the controls in each of the processors allow simultaneous (concurrent) execution of different PLO instruction instances on multiple processors using the same, or different, blocking symbols in their PLO instruction instances. Each processor extracts a blocking symbol from each PLO instruction execution. Then processor hardware-microcode hashes the blocking symbol to generate the location of an associated hardware lock field in protected storage. Only software selects and associates the PLO instruction's blocking symbol with a computer resource unit, and only the processor hardware-microcode associates each executing blocking symbol with a hardware lock through a hashing operation on the blocking symbol. Thus, a processor must obtain a hardware lock for each blocking symbol while executing any PLO instruction instance in protected storage not accessible to software. In this manner, the blocking symbols assigned by software control serialized accessing of associated storage resources by forcing all processors concurrently using the same hardware lock (concurrently accessed by all processors executing the same blocking symbol), so that concurrent PLO instruction access requests being made by multiple processors for the same resource unit assigned the same blocking symbol are forced to serialize their accesses to the resource, so that only one of these executing PLO instruction instances can have exclusive access to the same resource at a time.

Application Ser. No. 08/864,585 (PO997053) teaches a method using microcoded lock entries to serialize PLO instruction instances of different processors simultaneously attempting to use the same blocking symbol (which represents accessing the same resource unit as determined by operands in the PLO instance). The method uses blocking symbols in processor CLEs (CPU lock elements) to sequence a plurality of PLO instruction instances concurrently executing on different processors in a multiprocessor computer system that are concurrently using the same blocking symbol. Each CLE is associated with a respective processor, and each CLE may contain a blocking symbol (therein called a PLT, program lock token) obtained from a PLO instruction instance currently executing in the associated processor. Each CLE has a blocking symbol lock field H, which is set to held state to indicate when the associated processor has exclusive access to the resource unit associated with the blocking symbol, and contains a wait field for indicating any next processor to get exclusive control of the resource unit because it has a pending PLO instruction using the same PLO blocking symbol.

Application Ser. No. 08/924,890 (PO997054) provides a method of executing PLO instructions for supporting recovery of data if lost due to processor failure while executing a PLO instruction instance, and the method maintains the coherence of the recovered data through the processor failure and data recovery.

COMPUTER FUNDAMENTALS UTILIZED BY PLO INVENTIONS

The related applications teach the fundamentals of the PLO methods and means of using a blocking symbol in a PLO instruction for serializing multiple concurrent processor requests for accessing the same data resource, and completing all data accesses and all changes, if any, in the data resource during a single instruction execution instance. The PLO invention takes advantage of three fundamental facts existing in conventional computer systems, which are:

1. Conventional computer systems are designed so that their hardware and microcode cannot be changed by software programs executing on a system.
2. No software program can affect the hardware and microcode operating sequence used in the execution of a single instruction.
3. Conventional computer hardware and microcode does not prevent any data object (data resource) in a system's random access electronic storage (main storage) from being changed at any time without warning or indication to any processor accessing the data object. A software lock protocol is used in systems of multiple processors to prevent unknown changes to a data object over a sequence of instructions by an interfering processor in a system. Conventional software programs setup and provide an exclusive lock over a data object to serialize multiple processors concurrently requesting the same data resource. The software lock state must be maintained over plural instruction executions (plural instances) during which the program accesses, and may change, the data object (data resource).

The PLO invention recognizes a discovery that the software lock protocols are not highly efficient in maintaining the data coherence (data integrity) of data objects in computer systems.

The PLO invention can provide security and coherence for the data resources in a system if the PLO invention totally replaces the software lock protocol. The PLO invention cannot be concurrently used with the software lock protocol for a data object. This is because concurrent use of the software lock would bypass the protection for an object obtainable by the PLO invention. PLO functions provide multiple storage operations as part of a single instruction execution in which all storage accesses are a single logical unit of operation.

However, the PLO invention can coexist with the conventional software lock protocol in the same computer system, as long as they are used on different data objects in the system. That is, each data object can use either the PLO invention or the software lock protocol, but not both. This separate coexistence has the advantage of allowing new or modified programs supporting the PLO invention to be introduced and used in a computer system, while allowing the concurrent use of existing programs supporting conventional software lock protocols without having to undergo the expense of reprogramming them to use the PLO instructions. Therefore, it is possible to apply the PLO invention only to the programs accessing the critical data in a system.

Critical shared data objects (data resources) are found in all business activity, and business is predicated on maintaining the integrity of business data in a consistent manner. For example, what if the stock market were to accidentally start off a trading day using a version of some stock prices other than the closing version of the prior day? Or what if a version of the expense records of a business other than the last version at the end of the year were used for calculating income taxes? The dire consequences of failure to maintain data integrity are endless.

It is well known that catastrophic consequences which can occur when data integrity is lost due to security breach, or coherence failure by intentional interference or inadvertent occurrence such as by processor failure while the processor is changing data. This problem does not appear to have been adequately addressed in prior computer designs, having been left as a software concern. The maintenance of shared data integrity is the primary objective of the subject invention.

The prior compare and swap (CS) instruction, and the prior double compare and swap (DCS) instruction do not solve the problems solved by the PLO invention. These prior instructions only maintain the coherence of either a single word or two contiguous words in main storage. The CS instruction is particularly useful in atomically setting and resetting a software lock, and the DCS instruction is useful in atomically setting a software lock and an associated contiguous field. The CS instruction can guarantee that a software lock is obtained in a coherent manner, and the DCS instruction can guarantee that a software lock and a contiguous field are obtained in a coherent manner.

Prior to the PLO invention, no single instruction operation is known to exist in the prior art which can guarantee coherence and security of a data object (data resource) composed of multiple discontinuous fields. Further, the PLO invention can guarantee coherence and security even during plural accesses that change noncontiguous data elements in a data object.

It is to be noted that in the prior art of software-controlled locking, the obtaining of a lock and the freeing of the same lock on a resource must, necessarily, occur in two separate machine instructions. Between the two instructions, the software performs computational steps that require the serialization of the resource. The execution of multiple instruction instances during the locked state allows software error and processor failure to occur during instances between the instances that obtain and free the lock. If such error or failure occurs during any instruction executing while the lock is held, total system failure may result because the lock was not released. (This cannot happen with any PLO instruction because the lock is always in an unlocked state whenever any PLO instruction completes.) To enable prior system recovery from such multi-instruction untoward failure occurrences, complex prior system techniques were used, such as having each operating system provide a "lock manager" service that grants and frees locks independent of the failed resource operation, including recording locks in force to enable lock recovery by releasing a lock held by a failed program that was terminated or restarted, regardless of whether such failure was caused by software or hardware error. A prior processor call (for the lock manager system service for lock manipulation) added significantly to the program path length—particularly when the request was made by a problem state program, whereby a processor must be switched from problem state to supervisor state and back while obtaining the lock and also when freeing it. Therefore, this invention can eliminate the need for a lock manager program in a system that exclusively uses this PLO invention and avoids having programs that use software locking protocols.

No art other than the related applications cited herein is known to use blocking symbols for serializing access to shared resources, or for maintaining data integrity through the use of special PLO instructions that can access noncontiguous locations in a data resource in a single instruction execution instance.

SUMMARY OF THE INVENTION

This invention provides a set of new PLO instructions specifically designed for the processing of queues in storage, though they can be used for other purposes also.

A PLO blocking symbol defines, during execution of a PLO instruction instance, a data resource unit which may be any of the various types of data resources (data objects) associated with a unique blocking symbol. For example, a queue resource unit may be comprised of any number of noncontiguous queue elements assigned to a single blocking symbol.

Serialization control by the PLO invention allows execution of only one instance at a time (of concurrently executing PLO instructions containing the same blocking symbol) for accessing the same data resource defined by that blocking symbol. A single PLO instruction instance of execution can change a data resource at multiple noncontiguous locations while assuring the coherence integrity of the data resource.

A processor-accessible lock is provided for each blocking symbol, and each PLO instruction contains a specification of the blocking symbol in its blocking symbol field. The lock (not manipulatable by program instructions) enables hardware enforcement (by each of plural processors in a computer system) over the processor serialization of access to the same resource unit, without any possibility of any software program accessing the blocking symbol, or affecting the serialization control over accessing the resource, or affecting the setting of the blocking-symbol's microcode-controlled lock. This hardware enforcement applies to all processors capable of using PLO instructions.

During each single PLO instance, hardware-microcode in the processor executing the instance checks the lock (for the resource defined by the blocking symbol in the instance). The PLO lock should usually be found by a processor in an unlocked state, after which the processor locks, accesses, changes, and then unlocks the associated resource defined by the blocking symbol of the PLO instance.

It is important to note that the serialization state exists for the associated resource only during the PLO instance, and that the associated resource is in an unlocked state both before and after the single PLO instance. Thus, the resource is in an unlocked state when not a subject of any PLO instance, so that a processor should always find a required PLO resource lock in an available state, unless the resource is then being used by another PLO instance on another processor.

The preferred embodiment in this specification describes six new PLO instructions, each performing a different PLO function. Each of these PLO instructions contains a user-determined blocking symbol for representing an associated data resource unit, the same opcode (PLO), and a unique function code. The blocking symbol in any of these PLO instructions may represent any type of data resource in storage, but in the preferred embodiments the data resource unit (resource) is a queue, and it is assumed to be a queue of noncontiguous queue elements located anywhere in the storage.

All programs executing on any processor of a computer system use the same blocking symbol in all PLO instructions of any type that access the same storage resource. Whenever multiple processors simultaneously are to access the same resource, a conflict is recognized by having the same blocking symbol represent the resource to be accessed. Multiple processors serialize their access to the resource by each delaying its execution until it has exclusive control of the microcoded lock representing the specified blocking symbol. Only one processor at a time will execute one of the PLO instructions specifying the same blocking symbol. However, multiple processors may simultaneously execute multiple PLO instructions that specify different blocking symbols. In fact all processors may simultaneously execute an instance of the same PLO instruction function as long as each PLO instance specifies a different blocking symbol. Hence, as long as the multiple processors are using different blocking symbols during their simultaneous execution instances, no resource conflict exists and they may simultaneously access their required resources in performing their PLO instructions.

Plural changes may be made by any PLO instruction to one or more noncontiguous elements in a queue during a single PLO instance of execution. All programs executing on any processor of a computer system must use the same blocking symbol in all PLO instructions that access the same storage resource, e.g. same queue. Whenever multiple processors simultaneously attempt access to the same or different elements in the same queue (specified by the use of the same blocking symbol representing the queue to be accessed), the multiple processors serialize their access to the queue by one of the processors getting access and executing its PLO instance, and the other processors delaying execution of their PLO instances until each has control of the lock representing the specified blocking symbol. Non-PLO instructions are not allowed to be used for resource access in programs using PLO instructions.

The hardware-microcode of any processor initiating execution of a PLO instruction controls the serialization of its PLO instruction with any conflicting PLO instructions (having the same blocking symbol). That is, each processor checks a blocking symbol lock for an available state to determine when it can begin execution of its PLO instruction to control the processor's serialization with other processor conflicting PLO instructions.

When using this invention, a resource is in a PLO unlocked state most of the time. Thus a resource should be available for PLO locking most of the time, since the PLO locked state of any resource lasts only during the single instance of execution of each PLO instruction. During the single instance, the PLO instruction may make multiple changes in the accessed resource (at noncontiguous locations as well as at contiguous locations). Hence, a PLO instruction may perform multiple store operations to discontinuous storage locations as an atomic processor operation relative to the other PLO instructions specifying the same blocking symbol executing on other processors.

The six PLO functions specified in detail in this specification are particularly useful for the manipulation of programmed queues in main storage. They have unique function codes in their PLO instructions. Each of these PLO instructions have the same opcode (PLO) with its different function code (both of which may together be considered a long operation code. The six functions of these PLO instructions are: Compare and Load (CL), Compare and Swap (CS), Double Compare and Swap (DCS), Compare and Swap and Store (CSST), Compare and Swap and Double Store (CSDST), and Compare and Swap and Triple Store (CSTST). Each of these PLO instructions has a field for specifying the location of a blocking symbol representing the resource to be accessed; and in the detailed embodiment the microcode has a lock for this resource to indicate its available/locked state. As apparent from their names, each of these instructions includes a comparison of a data value to a field that is part of the resource, whose address is one of the operands of the PLO instruction. The comparison value reflects the state of the resource at a point in time. The comparison must be equal, or the rest of the PLO function is not performed. The equal compare indicates that the resource is in the state assumed by the executing program on this processor for the execution of the PLO instance. If the comparison is unequal, a program on some other processor has changed the state of the resource from that assumed. The program on this processor is signaled by a PLO condition code that the specified PLO function did not execute because of an unequal compare of the queue control field being compared to an earlier control value set up for the PLO instruction's compare operand. The program will reinitialize the PLO parameters in accordance with the new state of the resource, and reissue the PLO instruction specifying the new parameters. One example of a control field (which will be demonstrated in examples in the embodiments herein) is a sequence number associated with the resource (the sequence number is separate from, and not to be confused with, the blocking symbol). The sequence number is incremented each time the resource is changed, as part of a PLO instruction execution (the sequence number could be changed each time the resource is accessed by a PLO instance). For example, the program obtains the latest value of the sequence number in the queue (in preparation for a series of programmed steps for accessing members (elements) of a queue, which accesses are to occur while the queue remains in steady state during all the accesses, i.e., the queue does not change during all the accesses). It then uses a PLO instruction to access the queue, using the obtained sequence number as a comparison value against the current queue sequence number value in the PLO instruction. The PLO instruction accesses elements of the queue to ascertain information about its members, or to modify one or more elements. If the sequence number of the queue remains the same, as indicated by an equal-compare condition code from the instruction used to access elements of the queue, the result of processing the queue elements is known to have occurred with the queue in the same data state throughout the processing of queue elements.

However, if one of the instructions returns an unequal-compare condition code from the PLO instruction execution, the PLO instruction processing must be reinitialized with a new comparison value returned from the resource, and begun again. Where an unequal condition code is returned, the PLO instruction returns the new comparison value that can be used in the new attempt to traverse the queue elements.

In other cases, a particular value (which will change when the queue is changed) is accessed from the queue to be used as the PLO comparison value control field. Possible examples could be the address of the last queue element, or the address of the first queue element, or the address of a successor or a predecessor element of a particular element. If the field or fields being compared are not equal, the conditions assumed in formulating the PLO parameters no longer prevail, and reinitialization is necessary. If the compare is unequal, the other operations specified for a PLO of that type are not performed and the condition code is returned to the program, along with the new comparison value to be used in the next attempt at PLO execution. Examples of possible programming use of six PLO functions are shown in the embodiment, including processing of the unequal-compare result from PLO execution.

The comparison operation and, if the comparison is equal, the other operations of the PLO instruction occur as a single unit of computation as viewed by any other processor of the system that is performing a PLO instruction specifying the same blocking symbol. No storage field that is part of an ongoing PLO instruction will be accessed by another processor in performance of a PLO instruction specifying the same blocking symbol, since a processor must have exclusive control of the system lock for the specified blocking symbol before it can proceed in the execution of the PLO instruction. This invention allows the definition and implementation of PLO instruction functions that include multiple comparison values which are respectively compared to multiple operand fields within the storage resource represented by the specified blocking symbol, with multiple replacement values overlaying multiple storage fields in the resource, with all comparison and storage operations seen as a single logical unit of computation by any other processor (s) attempting to do a PLO instruction specifying the same blocking symbol. An example of such an instruction is Double Compare and Swap, described in detail herein. As programming requirements reveal the need, the method of this invention easily can be applied to the definition and implementation of other multiple-operation functions, including functions composed of more than two comparisons and more than two storage swap operations. In the prior art, such logical functions were performed by the use of a programming lock, which is not required in use of this invention.

While these six functions are particularly useful in manipulating queues, the new PLO instruction functions are defined generally, and are not specifically restricted to use in queue manipulation. They can be used to perform storage accesses on any storage resource with either joint (contiguous) or disjoint (noncontiguous) elements, such that the specified PLO function may perform all accesses defined for the single PLO instance without interference by storage accesses of other processors in the computer system, providing all such accesses are made by the programs using PLO instruction functions specifying the same blocking symbol. Control blocks, data tables, data base records, transaction data elements, and such, are different types of changeable resources which may be accessed using PLO instruction functions, where that is useful in programs. PLO instruction functions with the same blocking symbol are serialized by specification of the same blocking symbol, as previously described. A processor will not perform a PLO function unless it has control of the lock representing the blocking symbol, in the computer system implementation of which the processor is a part, and holds that lock during the entire execution of each PLO function specified for a PLO instruction instance being executed.

A PLO instruction instance thus allows multiple storage accesses to operands that are in different processor cache lines without interference by other processors, and without actually locking these lines exclusively in the processor cache. This is a consequence of blocking symbol handling by the processors doing PLO executions. To do these PLO functions without the use of the blocking symbol logical serialization technique would require the processors to contend for exclusive control of the multiple cache lines required. In an alternative implementation, if multiple processors each were executing an instance of this type of multiple-storage-access manipulation instruction at the same time, conditions would arise where one processor gets one required line, while another processor gets a second required line, each to perform its single instance of operation. Deadlocks would occur since each requires the other's line, and the other is holding it trying to get the other line(s) it requires to complete its specified operation.

To avoid this, complex time-out and back-out logic would be required as part of the processor design and implementation of the PLO-like instruction. Using the blocking symbol as the program's specification of all disjoint fields of a particular storage resource represented by that blocking symbol, the requirement for that complexity and the possible performance degradation that it entails is eliminated from the computer system and from the processor design.

The idea of a data field comparison for an operation of this type exists in the prior art, not associated with multiple disparate operands in storage, i.e., in different cache lines. As an example, the prior S/390 Compare and Swap instruction contains a comparison operand that is compared with a storage operand, and if the comparison is equal, the contents of the third operand replace the contents of the storage operand. But, in the S/390 definition of the instruction, the comparison operand and the replacement operand are in general purpose registers which are local to the processor performing the instruction. Thus, only one storage cache line is involved in the operation. The comparison followed by the store if the comparison is equal is treated as a single unit of operation as seen by other processors of the computer system by the provision of special hardware which provides an interlocked update capability to handle this special case involving two accesses to the same cache line.

The blocking symbol is unique in that it serializes the multiple disjoint storage accesses required by a processor to perform a complex storage operation with regard to operations by other processors of a shared storage multiprocessor system, but the symbol itself has no physical meaning to the hardware or microcode of the system. It is a logical parameter with meaning only to the programmer who defined it to represent the storage resource that requires serialization for a disjoint set of storage accesses, and who uses it in the PLO instructions in his program to obtain the required serialization. By requiring the processor performing the PLO to delay any pending PLO operation until the PLO lock for the specified symbol is obtained, the program obtains correct results in such multiple-storage-access instructions without the elements of processor implementation having a specific cognizance of the meaning of the symbol.

In a cited related application, the PLO blocking symbols were called "Program Lock Tokens" (PLTs) to emphasize that software programs select the tokens (blocking symbols), but computer system hardware and microcode controls how the tokens are used. The hardware-microcode is invoked by each instance of execution of any PLO instruction to automatically control a hardware lock provided for the requested resource. Unlike software locks, the PLO locks are not addressable by software, and therefore are hidden from programs using the locks. Software programs are not able to view or to control the locks directly, because the lock is not part of the program-processor interface. Rather, the locks are accessed internally in the hardware-microcode which control the required serialization of the associated resources using blocking symbols. This characteristic of PLO hardware locks makes them superior to software locks.

In this application, the six specific instructions used to illustrate the method of the invention are described as functions of a Perform Locked Operation instruction. They clearly indicate that the multiple storage operations of each function are serialized by the blocking symbol with respect to the operation of other processors of the system attempting to do instructions of the same type. However, the methods described herein are easily applied to the definition of separate instructions specifying blocking symbols. While such compound serialized functions may be defined in certain architectures as functions of a single instruction, as they have been in S1390 Architecture, they may be defined as independent instructions in other computer architectures, as well, without difficulty.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings which are:

FIGS. 1A and 1A(1) illustrate a general format for PLO Instructions.

FIG. 1B illustrates the general format of a PLO Compare and Load, CL, Instruction.

FIG. 1C illustrates the general format of a PLO Compare and Swap, CS, Instruction.

FIG. 1D illustrates the general format of a PLO Double Compare and Swap, DSC, Instruction.

FIG. 1E illustrates the general format of a PLO Compare and Swap and Store, CSST, Instruction.

FIG. 1F illustrates the general format of a PLO Compare and Swap and Double Store, CSDST, Instruction.

FIG. 1G illustrates the general format of a PLO Compare and Swap and Triple Store, CSTST, Instruction.

FIG. 1H is a flow diagram of the initial part of a process used by a computer processor for beginning the execution of any of the PLO instructions disclosed in this specification.

FIG. 2 is a flow diagram of a process for executing a PLO Compare and Load, CL, instruction.

FIG. 3 is a flow diagram of a process for executing a PLO Compare and Swap, CS, instruction.

FIG. 4 is a flow diagram of a process for executing a PLO Double Compare and Swap, DCS, instruction.

FIG. 5 is a flow diagram of a process for executing a PLO Compare and Swap and Store (CSST) instruction, a PLO Compare and Swap and Double Store (CSDST) instruction, and a PLO Compare and Swap and Triple Store (CSTST) instruction.

FIG. 6B is an example of a queue which may be examined by the example represented in FIG. 6A.

FIG. 7A shows a flow diagram of an example of a program for executing a PLO Compare and Swap, CS, instruction.

FIG. 7B represents the example as a queue which may be changed by the program represented in FIG. 7A.

FIG. 8A is a flow diagram illustrating an example of a program using the PLO Compare-and-Swap-and-Store instruction, and FIG. 8B represents a queue being changed by the instruction processing shown in FIG. 8A.

FIG. 9A and 9B are a flow diagram illustrating an example of a program using the PLO Compare and Swap and Double Store instruction to insert a new element in a queue, which is shown in FIG. 9C, in which the new element is maintained in priority order with the lowest priority number value closest to the head of the queue.

FIG. 10A and 10B are a flow diagram illustrating an example of a program using the PLO Compare and Swap and Triple Store instruction to move an element from the top of one queue, Q1, to become the top element of a second queue, Q2.

FIG. 10B illustrates the queues operated on by the example program of FIGS. 10A and 10B.

FIGS. 11A, 11B and 11C provide an example illustrating use of the PLO Double Compare and Swap instruction to remove an element from a queue, in which each queue element contains the addresses of its predecessor and successor elements in the queue.

DESCRIPTION OF THE DETAILED EMBODIMENT

Figure 6A:
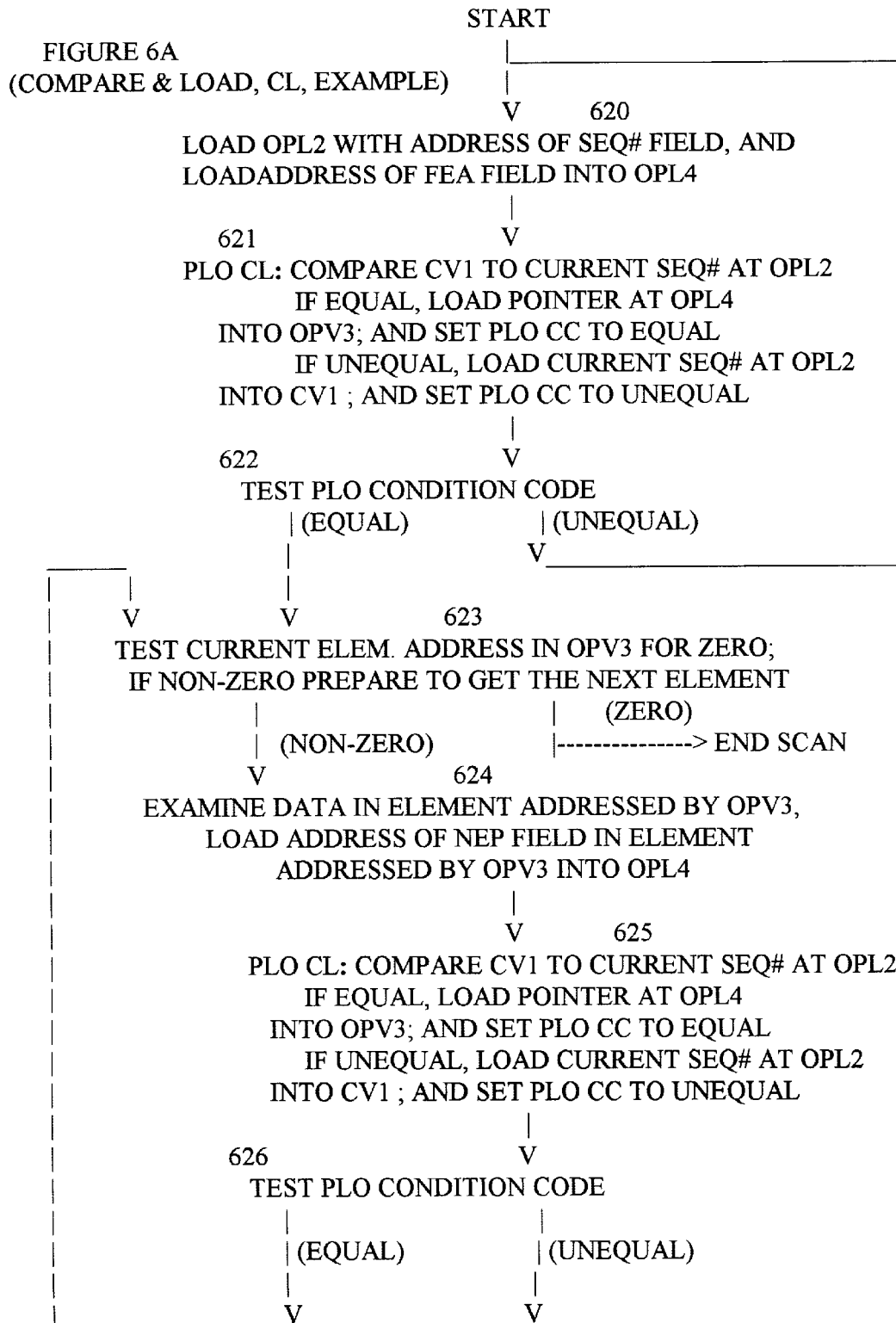
FIG. 6A shows a flow diagram of an example of a program for executing a PLO Compare and Load, CL, instruction.

FIG. 1A depicts a short format which may be used by the Perform Locked Operation (PLO) instructions, in which OPL4 is the address of an operand list which may contain any number of OPV and OPL operands of the same instruction. Specific function PLO instructions which may use the illustrated formats are shown in FIGS. 1B–1G.

Each PLO instruction contains an operation code (OP CODE) field which may be common to all PLO instructions and is extended by a specific function code (FC) field. Each PLO instruction also contains a blocking symbol (BLS) field that either contains a blocking symbol or points to the blocking symbol, and a number of operand fields of various types, shown as CV, RV, OPV and OPL in the detailed formats shown in FIGS. 1B through 1G which provide the specific PLO instructions described herein. Each of these specific PLO functions use the same instruction operation code, PLO, which results in all of these instructions performing a PLO function under the umbrella of a blocking symbol, BLS, explained in detail in the related PLO applications cited herein. The BLS is unique in PLO instructions, and it may be used in software programs to uniquely identify storage resources in system shared storage which is shared among different programs which may execute on different processors in the computer system.

The same BLS may be used in one or more programs simultaneously executing on a plurality of processors in the system. The processors concurrently using the same BLS are forced to serialize their use of the resource identified by the BLS, whereby only one processor can access the resource at a time to change it, or to fetch from the resource while it is being change by another processor. Thus serialization protects the data integrity of the storage resources in a system and the integrity of data being used by programs using such resources. The same BLS value will always be interpreted by all processors in a system in the same manner, in which any processor always accesses the same hardware lock when interpreting the same BLS value to thereby associate each particular BLS value with one (and only one) hardware lock. Different embodiments for associating the PLO BLS with a hardware lock are disclosed and claimed in application Ser. No. 08/864,402 (PO996083) and Ser. No. 08/864,585 (PO997053), both previously cited herein.

The serialization protection by any BLS is controlled by system hardware which can not be affected by software, even though the values of the BLSs are selected by software. However the serialization protection cannot be affected by software because it is not accessible by software, since it is buried in hardware only accessible to the processors in the system. This BLS hardware protection barrier used by this invention is provided by special hardware in each processor, which during execution of each PLO instruction associates its BLS value with a hardware lock in a protected storage accessible by all processors which can execute PLO instructions, but this protected storage and its PLO locks are not accessible by software addresses. As a consequence, no software can get control of a PLO lock.

PLO locks are incompatible with semaphore locks and software locks used for serializing access by processors to a storage resource. Thus, PLO locks (and PLO instructions) cannot be used when either a semaphore lock or a software lock is used to protect a resource by serialization.

Another incompatibility between PLO locks, semaphore locks, and software locks is: PLO locks can only lock a resource (identified by a PLO BLS) during one instance of instruction execution. In fact, a PLO instruction cannot lock a resource for more than one instance of instruction execution, since the PLO locked state (on state) only exists within a single PLO instance of execution. Thus a PLO lock is always set to its available (off) state at the end of any PLO instruction instance of execution. Therefore a PLO instruction can never be used to set a PLO locks to the locked state for use by a software operation, because software operations necessarily require the locked state to exist for a resource during execution of a plurality of instruction instances during which the resource is accessed and may be changed by additional software instructions. No PLO instruction can maintain the hardware locked state to meet these software requirements. However it should be understood that a PLO instruction could be used to set and reset a software lock located in program addressable memory for use by software.

On the other hand, a semaphore lock, or a software lock must lock a resource for a plurality of instruction execution instances, since they take one instruction instance to set their lock, one or more instruction instances to access and change the resource, and another instruction instance to reset their lock to allow another processor to access the same resource.

The function code, FC, in each PLO instruction controls the specific function performed by each PLO instruction. Each FC is associated with a specific set of hardware and/or microcoded instructions (not available to software) which defines and performs the specific PLO function to define, locate and handle an associated specific set of operands that will enable the expected performance of the respective PLO instruction function. Software instructions prepare values and addresses placed in locations defined for the PLO set of operands, which are to be performed by the respective PLO instruction function. The number and types of operands specified for each of the different PLO instruction functions depend on the function performed by the respective PLO instruction. Hence, the combination of operands differs for the different PLO functions.

This detailed specification describes six specific PLO instructions (differing in their FC values and operand sets) which are illustrated herein for manipulating different aspects of queues stored in the shared memory of a multiprocessor computer system. The six specific PLO instructions described herein are as follows:

FIG. 1B shows a PLO Compare and Load (CL) Instruction.

FIG. 1C shows a PLO Compare and Swap (CS) Instruction.

FIG. 1D shows a PLO Double Compare and Swap (DSC) Instruction.

FIG. 1E shows a PLO Compare and Swap and Store (CSST) Instruction.

FIG. 1F shows a PLO Compare and Swap and Double Store (CSDST) Instruction.

FIG. 1G shows a PLO Compare and Swap and Triple Store (CSTST) Instruction. These six specific PLO instructions respectively have the following different function codes: CL, CS, DSC, CSST, CSDST, and CSTST.

The FIGURES of this application contain the terms defined below:

| | |
|---|---|
| BLS | specified blocking symbol |
| FC | specified function code |
| CV1 | first operand comparison value |
| CV3 | third operand comparison value |
| RV1 | first operand replacement value |
| RV3 | third operand replacement value |
| OPL2 | second operand location |
| OPV3 | third operand value |
| OPLn | nth operand location |
| OPVn | nth operand value |

OPL operands are found in storage at the address formed by normal processor address arithmetic using fields from the instruction and the content of specified general purpose registers or using fields in a parameter list associated with the PLO instruction instance. Thus, OPV operands are values found in general purpose registers, or in a parameter list in storage. FC specifies the particular operations to be performed by the processor. Six different functions are illustrated by the instructions in FIGS. 1B–1G, but the methods taught here can be applied to an unlimited number of such functions. BLS specifies the blocking symbol that a programmer has associated with the storage resource that is the target of the PLO instruction. RV is the value that replaces the operand that was compared to CV in a PLO Compare and Swap like function. All of the PLO instruction fields and operands are accessible only to the processor executing the PLO instruction instance so that their contained values and addresses cannot be contaminated by another processor's operations.

FIG. 1H is a flow diagram which is entered upon the initiation of execution in any processor for any PLO instruction when the PLO opcode specification is detected in the PLO instruction. Each instruction executes for an instruction execution instance (instance), which is a very short period of time lasting from the initiation of execution to the completion of execution of this one instruction, during which the processor does nothing else. In step 101, the processor decodes the instruction and detects it has a blocking symbol specification (BLS). The field containing the BLS may be a value (the BLS itself) or an address to a BLS value which is then accessed and processed in step 101.

In step 102, the processor accesses in the processor's microcode storage any hardware lock associated with this blocking symbol by any other processor, and checks the state of the lock. If no lock is found associated with the blocking symbol, the processor assigns a hardware lock to the blocking symbol and in step 103 sets it to the unavailable (locked or busy state) state. If a processor initiating execution of a PLO instruction finds the blocking symbol is in a locked state (unavailable), another processor is using the lock; and this processor cannot use the resource represented by the blocking symbol. Then, the initiating processor must wait until it can obtain the lock assigned to the blocking symbol, when it will find the lock in the available state (unlocked or unbusy state), wherein it will set the lock to locked state to inform any other processor wanting access to the data resource (e.g. a queue represented by that BLS) that it must wait for the resource until it finds the blocking symbol lock in the available (unlocked) state. In this manner, all processors concurrently executing PLO instructions using the same BLS will serialize themselves so that only one at a time of these processors will access the resource. Thus, if plural concurrently executing PLO instructions are using the same BLS, they are required by the hardware lock to sequentially access the resource (i.e. serialize) so that only one processor at a time can change the resource. Thus, only one PLO instruction execution instance at a time is allowed to change the resource, thereby preventing more than one processor from concurrently changing the resource. However, plural PLO instance having different BLS values can be accessing different resources at the same time in the system.

The next step 103 sets the available lock to the unavailable state, decodes the other instruction fields and obtains the FC field. The process then sequences through the FC testing from steps 104 to step 109, each comparing the FC field content with one of the six FC values stored in the program, representing the different function performed by the CL, CS, DSC, CSST, CSDST, and CSTST instructions. The FC code selects the processor microcode and hardware which executes the PLO instruction, including predetermined locations for the operands specified for the specific PLO FC.

The yes exit is taken whenever any of steps 104 to step 109 obtains a compare-equal result. If no compare equal result is found by any of steps 104 through 109, the no exits are taken to step 110 which sets the lock to its available state and generates an exception signal, indicating an invalid FC specification exception (because in this example the system can only use the six PLO functions), and the PLO instant is ended at step 111, and the processor is returned to its current program to obtain its next instruction to be executed.

Thus if the compare equal condition is obtained by any of steps 104 through 109, that step takes its yes exit to a process in the indicated one of FIG. 2, 3, 4 or 5, which is represented by a flow-diagram entered at a respective letter (A, B, C or D) from the exit taken in FIG. 1H.

For example, if the A exit is taken from step 104, the detected function code is Compare-and-Load (CL), and processor control passes to entry point A in FIG. 2. At step 105, the function specified is Compare-and-Swap (CS), and control passes to entry point B in FIG. 3. At step 106, the function specified is Double-Compare-and-Swap (DCS), and control passes to entry point C in FIG. 4. At step 107, the function specified is Compare-and-Swap-and-Store (CSST), and control passes to entry point D in FIG. 5. At step 108, the function specified is Compare-and-Swap-and-Double-Store (CSDST), and control passes to entry point D in FIG. 5. At step 109, the function specified is compare-and-Swap-and-Triple-Store, and control passes to entry point D in FIG. 5.

FIGS. 2, 3, 4 and 5 show flow-diagrams of the methods executed by the six different PLO functions. The remaining FIGS. 6A through 11C provide programming examples of the queue-manipulation performed using the PLO processes in FIG. 2, 3, 4 and 5 to explain their operational complexities. FIGS. 2, 3, 4 and 5 perform the following different queue manipulation methods:

1) The CL function is performed in FIG. 2. (It is used in a queue-scanning example represented in FIGS. 6A and 6B.)
2) The CS function is performed in FIG. 3. (It is used in a queue-manipulation example represented in FIGS. 7A and 7B.)
3) The DCS function is performed in FIG. 4. (It is used in a queue-manipulation example represented in FIGS. 11A, 11B and 11C.)
4) The CSST function is performed in FIG. 5. (It is used in a queue-manipulation example represented in FIGS. 8A and 8B.)
5) The CSDST function is performed in FIG. 5. (It is used in a queue-manipulation example represented in FIGS. 9A, 9B and 9C.)

6) The CSTST function is performed in FIG. 5. (It is used in a queue-manipulation example represented in FIGS. 10A and 10B.)

FIG. 1B depicts an architecture for a PLO Compare-and-Load instruction, which contains, in addition to an opcode, a BLS which specifies a blocking symbol location containing a programmer specified blocking symbol value, and a CL value in its FC field. The remaining four operands are shown as: CV1 (a comparison value), OPL2 (a second operand location), OPV3 (a third operand value), and OPL4 (a fourth operand storage location).

FIG. 2 shows the processing logic for executing a PLO instruction having the PLO CL function. It is entered at point A and step 201, at which specified values of all operand parameters in the PLO instruction are obtained and interpreted. Each of these operands is specified as being in a register or in a storage location.

At step 202, a comparison value (CV1), previously obtained from a second operand location OPL2, is compared to the current content at the second operand location OPL2. Then, step 203 checks the result of the comparison for equality. If the compared values are not equal, control passes to step 204, which places the second operand value (at OPL2) into the CV1 comparison value location, and at step 205 the condition code (CC) of the PLO instruction is set to indicate the unequal condition. At step 208, the hardware lock for the blocking symbol is released by the processor which sets the lock to its available state (note that the lock was set to its unavailable state at step 102 in FIG. 1H). At step 209 the PLO instruction execution is ended (completed), and the processor then executes its next instruction. Subsequent instructions may use the PLO condition code in determining which program path the processor's execution should take.

If at step 203 the equal condition is found, step 206 next places the fourth operand value (at OPL4) into the third operand OPV3. Then step 207 sets the PLO instruction's condition code to zero to indicate the equal condition (which indicates a successful PLO operation). Step 208 is entered for the processor to release the hardware lock on the blocking symbol, and processor control then goes to step 209 to end the PLO execution instance, and it then executes the next processor instruction.

FIG. 1C depicts an architecture for a PLO Compare-and-Swap instruction, CS, which specifies the operands: CV1 (a comparison value), RV1 (an associated replacement value), and OPL2 (a second operand location), in addition to the specified PLO opcode, BLS field, and CS function code field.

FIG. 3 is entered at point B (from the PLO processing started in FIG. 1H) to continue the execution of the CS process. FIG. 3 shows the logic performed by a PLO CS function. The compare and swap function allows fast store operations during a single instruction execution, while protecting the resource against interim changes to it by other processors. In more detail, the compare and swap function enables pre-prepation of store and test parameters to be used in changing a resource, which are later conditionally used during execution of a PLO instruction to change the resource only if the test parameter(s) has not been changed since it was prepared.

At step 301, all operand specification values of the instruction are obtained. These operands may be values or addresses provided in programmable registers and/or in storage locations. At step 302, the CV1 comparison value is compared with the content of the second operand location OPL2. At step 303, the results of the comparison are checked for equality.

If the operands are not equal, step 304 places the second operand value at OPL2 into the comparison value CV1. At step 305, the PLO condition code is set to indicate an unequal compare (e.g. a non-zero value). Then, step 308 releases the lock (sets it to available state) for the blocking symbol, and step 309 ends the PLO execution instance. The final step 309 returns the processor to its next instruction.

If at step 303, an equal compare is sensed, the path to step 306 is taken which stores the replacement value RV1 into the second operation location OPL2. Then, step 307 sets the condition code to zero, indicating an equal compare, and proceeds to steps 308, 309 to end the instruction, as already described.

FIG. 1D depicts an architecture for the PLO Double-Compare-and-Swap function instruction, DCS. It contains the additional operands: CV1 (a first operand comparison value), RV1 (an associated replacement value), OPL2 (a second operand location), CV3 (a third operand comparison value), RV3 (another associated replacement value), and OPL4 (a fourth operand location), in addition to the BLS and the DCS function code fields. The PLO DCS function uses two compare operations.

The DCS function is generally used to change a resource (e.g. queue) at two noncontiguous locations in a resource (e.g. queue). The DCS function is extendable to allow a single PLO instruction to change a resource at any number of noncontiguous locations in a resource, which is done by providing multiple compare and swap operations, MCS, in the same PLO instruction. Accordingly, the PLO MCS function has an additional set of compare and swap operands for each noncontiguous location to be changed in a resource. Thus a particular PLO MCS instruction can be provided for supporting any number of changes at noncontiguous locations in a resource.

FIG. 4 shows the logic for processing the PLO DCS function, which is entered at C. In step 401, the specified values of the required operands are obtained from this execution instance of the PLO instruction. At step 402, the first operand comparison value CV1 is compared with the second operand value at OPL2. At step 403, the result of the comparison is sensed. If the compare is unequal, step 404 is entered and it places the second operand value at OPL2 into the first operand comparison value CV1. Step 405 then sets the PLO condition code to indicate an unequal first compare. Then, control passes to step 406, which has the processor release the hardware lock to make it available to other PLO instances using the blocking symbol. Step 407 ends the PLO execution instance, and enables the processor to execute the next instruction in the processor program.

If an equal comparison is sensed at step 403, step 408 is entered to perform the second comparison of the DCS function; it compares the third operand comparison value CV3 with the fourth operand value at OPL4. Step 409 senses the result of the second comparison. If the second comparison is unequal, processor control passes to step 410 which places the fourth operand value at OPL4 into the third operand comparison value CV3. Step 411 sets the PLO condition code to a CC value which indicates that the first compare at step 403 is equal but the second compare at step 409 is unequal. Then, processor control passes from step 411 to steps 406 and 407, already described.

If step 409 sensed an equal second compare (after an equal first compare is sensed at step 403), step 412 is entered to store the first operand replacement value RV1 at the second operand location, OPL2, and step 413 stores the third operand replacement value RV3 into the fourth operand at OPL4. Then, step 414 sets the PLO condition code to zero to indicate the two equal compares. Finally, control passes to steps 406 and 407, as previously explained.

FIGS. 1E, 1F and 1G depict architecture for three PLO instructions which perform different numbers of store operations, which are: Compare-and-Swap-and-Store (CSST), Compare-and-Swap-and-Double-Store (CSDST), and Compare-and-Swap-and-Triple-Store (CSTST). Each of these three PLO functions includes only one compare and swap operation for using a single control field (such as a sequence number) in a resource. This PLO compare and swap operation provides a second level of data integrity protection in the resource, operating under the primary level of data integrity protection obtained by using the hardware-lock-controlled blocking symbol in the PLO instruction.

The CSST, CSDST, CSTST instructions differ in the numbers of pairs of operands they contain, each having a different number of pairs, each pair containing an OPVn operand and an OPLn operand. Each operand pair controls one change in a resource at any noncontiguous location in the resource. This type of PLO instruction can be extended to a Compare-and-Swap-and-Multiple-Store (CSMST) function, which can make any number of changes at noncontiguous locations in a resource, in which an additional OPVn/OPLn operand pair is provided in the CSMST instruction for each additional change that is to be made at any noncontiguous location in a resource. The maximum number of OPVn/OPLn operand pairs usable in a CSMST instruction is generally determined by the maximum time allowable for execution of a PLO instruction instance, since the execution time of a PLO CSMST instance is increased by each additional pair provided in the instruction.

It should be understood that PLO instruction supported changes at noncontiguous locations in a resource also allow the same PLO instruction to make changes in the resource even though some or all of the specified operands in any PLO instruction are at contiguous locations in the resource.

Each store operation is performed by an OPVn/OPLn operand pair in each CSST, CSDST, CSTST, or CSMST function for a PLO instruction. These operands may be specified in registers and/or storage locations. Each of these instructions specify a first operand comparison value, CV1, an associated replacement value (RV1), a second operand location (OPL2), a third operand value (OPV3), and a fourth operand location (OPL4). The CSDST instruction specifies all of the fields in the CSST instruction, and additionally specifies a fifth operand value OPV5 and a sixth operand location OPL6. The CSTST instruction specifies all of the fields in the CSDST instruction, and additionally specifies a seventh operand value OPV7 and an eighth operand location OPL8.

FIG. 5 shows the logic of processing each of the PLO CSST, CSDST and CSTST instructions. At step 501, all required operand specifications are obtained from the instruction instance, which may be specified in programmable registers and/or in storage locations. At step 502, the operand comparison value CV1 is compared with the second operand value OPL2. At step 503, the result of the comparison is sensed. If the compare was unequal, step 504 places the second operand value at OPL2 into the first operand CV1. At step 505, the PLO condition code is set to indicate the unequal compare result. At step 506, the blocking symbol hardware lock is released (set to available state by the processor). At step 507, the PLO instruction execution instance is ended, and a return made to the current processor program, which may test the newly provided condition code.

If at step 503 an equal compare is sensed, step 508 places the first operand replacement value RV1 into the second operand location OPL2. Then, step 509 stores the third operand value OPV3 into the fourth operand location OPL4.

If the function code is CSST, the next step 510 passes processor control from step 509 to step 512 to set the condition code of the PLO instruction to indicate an equal compare occurred (indicated by setting the CC to zero value); and the remainder of step 510, and step 511, are not used.

If step 510 is for a CSDST or CSTST function, the additional operand pair OPV5/OPL6 is used for which step 510 stores the fifth operand value OPV5 into the sixth operand location OPL6. If step 510 if for a CSDST function, step 510 completes and passes processor control to step 512 to set the PLO CC to zero.

If step 510 is for a CSTST function, step 511 is performed for the additional operand pair OPV7/OPL8, for which the seventh operand value OPV7 is stored into the eighth operand location OPL8. Step 511 then passes processor control to step 512 to set the PLO CC to the zero value.

If the PLO instruction is performing any CSMST function for more than three changes in a resource, the process in FIG. 5 is extended after step 511 with an additional step identical to step 511 for storing each additional operand value OPVn into the additional operand location OPLn of each additional operand pair, until the stores for all operand pairs have been performed as specified in the particular CSMST instruction. When all pairs are stored, processor control passes to step 512 to set the PLO CC to zero.

After step 512 is performed, steps 506 and 507 are performed as previously explained to complete the PLO instruction instance.

FIGS. 6A through 11C are used to explain examples which use the PLO instructions having methods of operation defined in FIGS. 1H through 5. FIGS. 6A, 7A, 8A, 9A and 9B, 10A, 11A and 11B each represent a software program used for demonstrating an example of operation of one of the PLO instructions disclosed in FIGS. 1B–1G.

The exemplary programs in FIGS. 6A, 7A, 8A, 9A, 10A, 11A and 11B show novel ways in which PLO instructions are used to atomically perform resource-changing operations on a queue type of storage resource. The atomic character of the queue-change processes in these FIGURES guarantee the integrity of the data in the queue after the changes have been made, because no other processor operation can make interfering changes in the queue. Further, this atomic guarantee extends to all changes made in a queue by execution of a PLO instruction (whether at contiguous or noncontiguous locations in the queue).

FIGS. 6A and 6B illustrate an example of the use of the PLO CL function on a queue as the resource associated with the blocking symbol in the PLO CL instruction. FIG. 6B shows a queue having a queue anchor 601 which has a first field containing a sequence number, SEQ#. The SEQ# is incremented every time the queue is accessed for being changed, by a programming convention (i.e. a protocol). By programming convention, a sequence number in the queue anchor is incremented every time an element is added to or taken from the queue.

Anchor 601 has another field containing a First Element Address, FEA, for locating a first element 602A of the queue. Boxes 602A, 602B . . . 602Y, and 602Z depict a sequence of elements in the queue. Each element contains a Next-Element Pointer, NEP, address field, and a data content field, DATA.

The objective of the program in FIG. 6A is to examine DATA in each element of the queue, in turn, but examine DATA only if the queue has remained in the same state during the entire examination scan of the queue. In other words, should an entry be added or deleted from the queue during the program's examination of any element, the scan must begin anew from the beginning. The PLO CL instruction is used to detect when the sequence number does change during the traversal of the queue. The logic of the program to do this is shown in FIG. 6A, and the queue is shown in FIG. 6B. The program in FIG. 6A does not change any element in the queue. Any change to the queue would be done by another program not part of the program in FIG. 6A.

In FIG. 6A, step 620 loads the location of the sequence number, SEQ#, in the anchor into operand OPL2, and then loads the value of the sequence number, SEQ#, into CV1 to begin a scan of the elements in the queue. Step 620 also loads into the OPL4 operand the address of the FEA field in the anchor. Then step 621 performs a PLO CL instruction to determine if the SEQ# value in the anchor has been changed during the queue scan from its value previously stored in CV1 at the start of the scan. If the PLO CL instruction finds the SEQ# has changed, the scan must start all over again.

When step 621 executes the PLO instance, the PLO CL instruction compares the value stored in CV1 with the current value at OPL2 (the current value of SEQ# in the queue anchor), and if CV1 is not equal to the current SEQ# at OPL2, the PLO instance replaces the value in CV1 with the the current value of SEQ# at OPL2, and returns a condition code indicating unequal compare. If they are equal, the PLO CL instruction loads the FEA pointer value at OPL4 into OPV3, and sets the PLO condition code to indicate an equal comparison, which indicates a successful execution of the PLO CL instance.

At step 622 the program executes an instance of another instruction which tests the PLO condition code resulting from the first PLO CL instance. If the PLO condition code indicates an unequal compare, processor control returns to step 620 to again start the scan. If the PLO condition code indicates an equal compare, the queue has not been changed, and the scan continues by going to step 623 which executes another program instance which tests the address of the current element in OPV3.

At step 623, the contents of OPV3, the current element address, is tested. If step 623 finds the current element address is zero, the scan is complete, and the program of FIG. 6A is ended. If step 623 finds the current element address is not zero, the content of OPV3 is the valid address of the current element in the queue and can be used.

If step 623 finds the the current element address is nonzero, then step 624 is entered to examine the DATA field in the current element according to any algorithm provided in the program which is executed here. Step 624 also loads the address of the NEP field in the element addressed by OPV3 into OPL4.

Then the program goes to step 625 to executes another PLO CL instruction instance to obtain the address of the next element on the queue and make that element the current element. It compares the old SEQ# value stored in CV1 with the current SEQ# value at OPL2 to determine if the current scan can be continued. If they are equal, the current NEP address at OPL4 is loaded into OPV3 in step 625, and the PLO CC is set to indicate the equal state.

If step 625 indicates an unequal condition, the queue has changed, the SEQ# at OPL2 is loaded into CV1, and the PLO CC is set to indicate the unequal state.

Step 626 tests the PLO CC state. If the equal state is indicated, the queue has not changed, and step 623 is reentered to continue the scan at the next element If step 626 finds the unequal state, the current scan is ended, and step 620 is reentered to start a new scan.

FIGS. 7A and 7B illustrate an example using the PLO Compare-and-Swap (CS) instruction. This example represents a queue modifying program (represented by the flow chart in FIG. 7A) which is comprised of a set of instructions, including the PLO CS instruction. The program example creates and atomically inserts a new element into a queue as the queue's first element. All modifications of the queue are done in this example by adding new queue elements at the head of the queue (i.e. as the first queue element addressed by the queue anchor).

The queue (shown in FIG. 7B) has a queue anchor at a predefined location in storage, from which any number of chained elements A, B . . . can be located anywhere in program addressable storage. The queue anchor has a field called First Element Address (FEA) which contains an address A for locating first element A. Each of queue elements, A, B . . . , has a field containing an address of its next queue element, if any, called a Next Element Pointer (NEP) field. Thus, the NEP in element A contains address B which locates the next element B in the queue, and so on.

To add a new first queue element, it must first be created in storage at a location X. In this example, the new element X is to be added to the queue as its first element (at the head of the queue), and its NEP field is set to address the current first element in the queue. Then, its address X must be atomically stored in the FEA field in the queue anchor to put the new element in the queue.

In a multiprocessor system, where programs executing on other processors may be simultaneously adding or deleting elements on the same queue, adding a new element at the top of the queue requires exclusive access to the queue by the program adding the new first element. This is done by serializing all processor requests for accessing the queue, in order to maintain queue integrity while the program is adding the new element to the queue. The PLO instructions are used for this purpose to atomically add the new element to the queue, so that all operations for adding the element in the queue are seen as a single logical unit of operation by the other processors of the computing system. The program-assigned blocking symbol (BLS) associated with the queue assures this.

In FIG. 7A at step 720, the new queue element X (shown at the top of FIG. 7B) is created in storage by executing a conventional program routine (not shown) to do so. At step 721, an instruction instance loads OPL2 with the address of the FEA field in the queue anchor, and CV1 is loaded with the FEA value (address A). RV1 is loaded with the address of the new element X. Step 722 places the FEA value (address A) into the NEP of the new element X.

At step 723, a PLO CS instruction instance is executed to attempt to atomically add element X to the head of the queue. The PLO CS instance compares the content of the old FEA value in CV1 with the current value of the FEA at OPL2 to determine if the FEA value has changed, which would indicated the NEP value preparation in new element X is no longer valid.

If the compare is unequal, the PLO CS instance has found the FEA has changed and the instance replaces CV1 with the new FEA located at OPL2 in the anchor element and sets the PLO CC to the unequal state. If the compare is equal, the PLO CS instance stores the RV1 content (i.e. address of the new element) into the FEA field in the queue anchor to atomically thread the new element into the queue. The NEP in the new element is valid because the FEA has not changed, and the PLO instance sets its CC to the equal state.

At step 724, an instruction instance is executed to test the PLO condition code. If the PLO condition code indicates an unequal state, the program branches back to step 722 to replace the NEP in the new element with the latest FEA, and the PLO instance at 723 is re-executed, which uses the new FEA value.

If at step 724 the PLO condition code indicates an equal state, the PLO CS instance has inserted the new element into the queue (as the new head element of the queue), and processor control executes the next sequential instruction in its program.

FIGS. 8A and 8B illustrate an example of a program which uses a PLO Compare-and-Swap-and-Store (CSST) instruction. This example represents operation of a queue modification program (represented by the flow chart in FIG. 8A) which includes the PLO CSST instruction to perform the operation of atomically changing the queue. The program creates and insert a new element into a queue as the queue's last element. The protocol used in this queue example is that all modifications of the queue are indicated by a change in a Last Element Address (LEA) field in the queue anchor.

In this example shown in FIG. 8B, the Queue Anchor contains both a First Element Address, FEA, and a Last Element Address, LEA. Each queue element contains at least a Next Element Pointer, NEP, which is an address of any next element in the queue. A zero value is provided in the NEP field of the last element R in the queue to indicate that it is the last element.

A new element S, is created at location S in storage and is to be inserted into the queue as its last element (i.e. at the end of the queue). Therefore element S has its NEP field set to zero at the time of its creation in storage.

A PLO CSST instance is used to insert the new element in the queue in an atomic manner by serializing the insertion operation with any other attempt by another processor to change the queue while the new element is being added to the queue. The last element insertion requires the address of new elements to be stored into the LEA field of the anchor, and to be also stored into the NEP field in the current last element (to overlay its zero value), which then becomes the penultimate queue element. No other processor of the system is allowed to change any queue field while element S is being inserted in the queue by the PLO CSST instance.

At step 810, the new queue element S is created at location S in storage, and the address of new element S is stored in operand RV1. At step 820, the address of the LEA field in the anchor is stored in operand OPL2, and the current value of LEA (at the OPL2 address) is stored in operand CV1. If the current value of the LEA is zero, the new element S will be the only element on the queue and both the FEA and LEA must be updated. This example does not illustrate the method used to update the queue anchor under that condition.

At next step 821 the address of the NEP of the last element is stored in operand OPL4 and the address of the new element S is stored in operand OPV3. At step 822, a zero value is stored in the NEP field of new element S.

Then at step 823, a PLO CSST instruction instance is executed to attempt to atomically insert the new last element into the queue. The PLO CSST instruction compares the old LEA value in CV1 with the current LEA value (currently the OPL2 location in the anchor). If they are unequal, the PLO instance replaces the CV1 value with the current LEA value at the OPL2 location, and sets the PLO CC to the unequal state. If they compare equal, the PLO instance stores the address in RV1 (the address of the new element) into the OPL2 location (in the LEA field of the anchor), and it stores the address in OPV3 (the address of the new element) into the OPL4 location (in the NEP field of the former last element), and sets the PLO CC to indicate the equal state.

At step 824, the program tests the PLO condition code state. If the unequal state is indicated, the queue has been changed by another processor adding another last element in the interim between the set up and execution of the PLO CSST instance in step 823. Then, the program loops to step 821 to prepare to again execute the PLO CSST instruction instance until step 824 finds the condition code indicating the equal state which indicates a successful execution of the PLO CSST instant. The new element is now in the queue and the processor continues to its next instruction.

FIGS. 9A and 9B illustrate an example of the use of PLO CSDST (Compare-and-Swap-and-Double-Store) instruction. This example shows a queue in which each element contains a priority number, and the elements are sequenced in the queue in priority order—with the element having lowest priority number value being addressed by the FEA field in the queue anchor as the first element in the queue sequence, and the element having the highest priority being the last element in the queue sequence. The example here inserts a new element in the queue at a location that maintains the priority number sequence of the elements in the queue.

FIG. 9B shows a double-threaded queue, in which each element contains a priority field containing a priority value PRI, a next element pointer field, NEP, and a predecessor element pointer field, PEP.

In the example shown in FIG. 9C, a new element C (to be inserted into the queue) is created at storage location C with a priority number 4 in its PRI field. Hence, the insertion position in the queue of new element C is between queue element 902 having a priority 3 at location B, and queue element 903 having a priority 5 at location D.

The programming procedure shown in FIGS. 9A and 9B starts at step 910 which creates the new element in storage. The new element is shown containing three fields in FIG. 9C, in which the PRI field is set to 4, and its PEP and NEP fields are initially empty.

In FIG. 9C the queue anchor 900 has a sequence number field SEQ# which is incremented each time a processor changes the queue. Step 920 stores the address of SEQ# in operand OPL2 and stores the current value in SEQ# into operand CV1.

Step 921 scans the queue elements by executing a scanning program (like that shown in the flow chart of FIG. 6A), as a subprogram, or inner loop, of the program represented in FIGS. 9A and 9B. The scanning process in FIG. 9A examines the PRI field in each element, and it is analogous to step 624 in FIG. 6A which examines a DATA field in each element while it sequentially scans the elements in the queue. If the queue is empty, the process of inserting the new element requires the FEA and LEA in the queue anchor be updated. This example does not show that processing. During the scan, step 922 compares each scanned element's PRI value with the new element's PRI value. The program in FIG. 9A ends when the scanning process either finds either a scanned element containing a PRI value greater than the PRI value in the new element, or reaches the end of the queue.

Step 922 also sets a condition code for the compare instance according to whether or not it finds the scanned element PRI value higher than the new element PRI value, and sets a condition code accordingly.

The step 923 tests the condition code (CC) set by step 922. Whenever the condition code indicates the scanned element has an equal or lower PRI than the new element, the process in FIG. 1A loops back to step 921 to go to the next element in the queue to compare its PRI value in step 922, etc. until step 923 finds the CC indicates the current element is higher or the end of the queue has been found, which causes the process to enter step 924.

If the end of the queue was reached without finding an element with a higher PRI, the new element is inserted as the new last element. The processing for that case is not illustrated here. At step 924, the PEP of the current element is obtained and used to access the predecessor element of the current element. In the next step 925, the address of the predecessor element is stored into the PEP field of the new element, and the address of the current element is placed in the NEP field of the new element. Then RV1 is set to the value in CV1 plus 1.

In FIG. 9B, step 926 loads the address of the new element into operands OPV3 and OPV5, and loads into OPL4 the address of the NEP in the predecessor element, and loads into OPL6 the address of the PEP in the current element.

Then, step 927 executes the PLO CSDST using the operands which have been set up in the previous steps of this program. This PLO instance compares CV1 and OPL2, and sets the condition code. If the compare is unequal, CV1 is replaced with the current sequence number in the anchor, and the PLO CC is set to indicate the unequal state.

If the compare is equal, the sequence number has not changed, indicating the queue has not changed, and the new element is atomically inserted into the queue: by storing the value in RV1 into the location at OPL2 (incrementing the sequence number since the queue is being changed); storing the value from OPV3 into the location at OPL4 (as the NEP in the predecessor element) and storing the value from OPV5 into the location at OPL6 (as the PEP in the current element). The PLO CC is set to indicate the equal state.

When step 928 tests the PLO condition code and finds it indicates the equal state, the SEQ# has remained the same throughout the scanning of the queue, and the new element has been inserted into the queue. When the PLO CC indicates the equal state, the execution of the PLO CSDST instance in step 927 has been successful, and it has performed a double store in two noncontiguous queue elements: The new element address (C) is stored in the NEP field of its predecessor element, and in the PEP field of the current element which has become the successor element of the new element after it is inserted in the queue.

FIG. 10A and B illustrate the use of the PLO Compare-and-Swap-and-Triple-Store (CSTST) instruction to move an element from the top of one queue, Q1, to become the top element of a second queue, Q2. A sequence number SEQ# is incremented every time either queue Q1 or Q2 is changed. The SEQ# is a value illustrated in box 1001 in FIG. 10B, which figure also shows queue anchor element 1000 and queue anchor element 1002 for the two queues. The Q1 anchor 1000 of the first queue has a First Element Address field (FEA) which always addresses the first element in Q1, and currently contains a value R which addresses a first Q1 element 1003. The Q2 anchor 1002 of the second queue contains a FEA which always addresses the first element in Q2, and currently contains a value A which addresses the first Q2 element 1004. The first Q1 element 1003 at location R is to be moved from Q1 to become the top element of Q2. This example does not illustrate the case where either queue is empty.

Thus the programming procedure shown in FIG. 10A moves the first element in Q1 to be the first element in Q2. It enters step 1020 which loads the address of SEQ# (in box 1001) into operand OPL2, and saves the current value of SEQ# in CV1. Step 1020 also generates a value of SEQ#+1 and loads it into operand RV1. Next step 1021 loads OPL8 with the address of FEA in the Q1 anchor, and loads into OPV7 the NEP in the element 1003 to be moved. The following step 1022 loads in OPL6 the address of FEA in the Q2 anchor, and loads into OPV5 the Q1 FEA (which is the address of the element 1003 to be moved). The next step 1023 loads in OPL4 the address of the NEP in the element to be moved, and loads into OPV3 the Q2 FEA.

At step 1024 a PLO CSTST instance executes the necessary three modifications to queues 1 and 2 to atomically move the element as a serialized single logical unit of execution as seen by the other processors of the computing system. The PLO CSTST instance compares the previously-stored value at CV1 with the current value at the OPL2 location to determine if any change has occurred in Q1 and Q2, and the PLO CC is set accordingly. Thus an unequal compare causes CV1 to be replaced with the current content at the OPL2 location, and the CC to be set to unequal state. An equal compare causes the atomic move by: storing OPV3 into the OPL4 location (providing the new NEP in the moved element), storing OPV5 into the OPL6 location (providing the new FEA in the Q2 anchor element), and storing OPV7 into the OPL8 location (providing the new FEA in the Q1 anchor element).

At step 1025, a following instance in the program tests the PLO condition code. If the test finds the unequal state is indicated by the CC, the first element move did not occur because either or both of Q1 and Q2 had changed. Then the processor control is returned to step 1021 to adjust the PLO operands to the changed queue state before re-executing the PLO CSTST instance.

If the test in step 1025 finds the equal state is indicated by the CC, the element has been successfully moved, and processor control goes to the next sequential instruction of the processor.

FIG. 11A, B and C illustrate an example of the PLO Double Compare and Swap (DCS) instruction. The example removes an element from the middle of a queue. The queue may be double threaded in which each queue element contains both a predecessor element pointer (PEP), and a next element pointer (NEP). Removal of an element from the queue requires changing the NEP in the removed element's predecessor element, and changing the PEP in the removed element's successor element.

In the example of FIG. 11C, an element at address C is to be removed from the queue. This requires two changes in the queue in two noncontiguous queue elements. One change is to the NEP field in the removed element's predecessor element B (at address B), the change being a storing in that NEP field of address D of the removed element's successor element D. The other change is to the PEP field in the removed element's successor element D (at address D), the change being a storing in the PEP field of address B of the removed element's predecessor element B.

The two store operations are pre-prepared before executing the PLO DCS instruction which then performs them in a single integral atomic processor operation as seen by the other processors of the computing system. The processor's atomic operation (which may be comprised of multiple fetch and store operations) must be seen by the other processors as an atomic or indivisible operation, so that no other processor may be changing the same fields in the queue during the PLO instruction instance of execution.

This atomic purpose is the primary reason for using the PLO instructions to make all changes to elements of any resource (the queue) identified by a PLO blocking symbol.

Therefore, all PLO instructions executing concurrently on all processors of a system for accessing the same queue must specify the same blocking symbol to maintain the atomic character of each PLO instruction execution instance regardless of the number of multiple store operations done during any single PLO instance. This atomic characteristic of all PLO instructions is guaranteed across all processors of the system, as long as only PLO instructions are used to change the queue.

In the example shown in FIG. 11C a queue element 1103 is selected for removal from a queue comprised of queue anchor 1100 and queue elements 1101 through 1104. Element 1103 (to be removed) is located in program-addressable storage at address C. The element's removal will store in NEP 1108 of predecessor element 1102 an address D (of successor element D), and will store in PEP 1111 of successor element 1104 an address B (of predecessor element B), wherein both stores will be done in a single PLO DCS instance of atomic execution.

Thus the exclusive use of PLO instruction instances for all changes to a queue guarantees that the multiple fields can be changed by a processor during any PLO instance of execution without interference by any other processor using PLO instances.

The PLO DCS instruction requires a program to pre-prepare the parameters to be stored into fields 1108 and 1111 before its PLO instance of execution. The PLO DCS instruction is designed so that the queue will not be changed in any manner, such as by removing element C, if either of the fields 1108 or 1111 has been changed after they have been used to pre-prepare the PLO parameters. The pre-preparation program stores in the PLO DCS operands, CV1 and CV3, the then existing values in fields 1108 and 1111, respectively. The addresses of these fields 1108 and 1111 are respectively stored in operands OPL2 and OPL4. The new values to be stored in fields 1108 and 1111 during the PLO instance are respectively stored in operands RV1 and RV3.

The execution of the PLO instance first compares its operands CV1 and CV3 to current values at the OPL2 and OPL4 locations, respectively, to determine if the current values are the same as the pre-prepared values (i.e. they compare equal). If they are different they will compare unequal. The operands RV1 and RV3 are stored at the OPL2 and OPL4 locations, respectively, only if the compare equal condition occurs. If the compare unequal condition occurs, the pre-prepared operands, CV1 and CV3 are again pre-prepared by replacing them with the current values at the OPL2 and OPL4 locations, respectively; and the process repeats until the compare equal condition occurs (which will occur when no other processor changes the predecessor or successor element during the interim period between the last pre-preparation and the occurrence of the following PLO instance by this processor).

In FIG. 11A, the queue has an anchor and four elements at the instant being illustrated, in which a First Element Address (FEA) contains the value A (in Queue Anchor 1100) for addressing the first queue element 1101 at location A. Over time, the number of elements in the queue may change as processing dictates. The current elements are 1101 at address A, 1102 at address B, 1103 at address C, and 1104 at address D. In this example, each queue element contains a PEP field and a NEP field at predefined offsets from the start of the element. The PEP and NEP fields indicate the order of the elements in the queue. In the example shown in FIG. 11C for illustration, the element at B is preceded in the queue by the element at A, and the successor of the element at B is the element at C. In this queue the first element (pointed to by the FEA in the queue header) has its PEP value set to zero to indicate it is the first element, and the last element (pointed to by the LEA in the queue header) has its NEP value set to zero to indicate it is the last element.

FIGS. 11A and 11B show the steps of a program process for removing an element in a queue and it can be any element in the queue except its first or last element. At step 1120, the PEP and NEP of the element to be removed is tested for zero to determine if it is the first or last element in the queue. If its PEP or NEP is zero, an alternative procedure (not shown) must be used for removing it.

In this example, element 1103 at address C is the element to be removed, and it is not the first or last element in the queue and therefore has a non-zero value in both its PEP and NEP fields.

At step 1122 compare operands CV1 and CV3 each are loaded with the address of the element to be removed. At step 1123 operand OPL2 is set to (loaded with) with the address of the NEP field in the predecessor B of element C to be removed. At step 1124, operand OPL4 is set to the address of the PEP field in successor D of the element to be removed. At step 1125, replacement operand RV1 is set to the NEP field of the element C to be removed. At step 1126 replacement operand RV3 is set to the PEP field of the element to be removed.

At this place in the program, the pre-preparation of the operands for the PLO DCS instruction is complete, and an instance of this instruction can then be executed. (The pre-preparation also includes specifying the blocking symbol operand, BLS, for identifying the queue as the resource to be accessed, and setting the operands containing the PLO and DCS fields, which are presumed to have been done and are not shown in any of the programs herein provided as examples of uses of PLO instructions in this specification.)

Then at step 1127 in FIG. 11 B, a PLO DCS instance is executed using the operands pre-prepared in the earlier steps of this program. Step 1127 compares the pre-prepared value stored at CV1 with the current value found at the OPL2 location to determine if the predecessor's NEP has changed, and also compares the pre-prepared value stored at CV3 with the current value found at the OPL4 location to determine if the successor's PEP has changed.

If the PLO DCS instance finds either one or both of the two comparisons are not equal, the DSC instance is suppressed, and it makes no change to the queue and step 1129A sets a PLO condition code to the program indicating this no-change outcome.

If the PLO DCS instance finds both comparisons are equal, step 1128 stores RV1 at the OPL2 location (to replace the predecessor NEP field content with the content of the removed element's NEP field), and also stores RV3 at the OPL4 location to replace the successor's PEP field content with the content of the removed element's PEP field.

In this manner, element C is removed by being unlinked from the queue. Now element B has its NEP field changed to address element D, and element D has its PEP field changed to address element B. Step 1129B then sets the PLO condition code to indicate that all changes have successfully occurred and that the PLO DSC instance has successfully completed. Finally, the processor executes its next instruction in its program.

While we have described our preferred embodiments of our invention, it will be understood that those skilled in the art, both now and in the future, may make various improvements and enhancements which fall within the scope of the claims, which follow. These claims should be construed to maintain the proper protection for the invention first disclosed herein.

Having thus described our invention, what we claim as new and desire to secure by Letters Patent is:

1. A method of protecting data integrity of a resource stored in a shared-memory of a computer system having multiple processors capable of accessing and storing in the resource, the method comprising:

executing an instruction in a program in the shared-memory containing an operation code and function code that control a processor to perform a special blocking symbol function during an instance of execution by the processor, indicating by the instruction a blocking symbol provided by a user of the program to identify a resource to be accessed exclusively by the processor during the instance, locating by hardware controls a blocking-symbol lock with the blocking symbol, and setting the lock for an instance of the instruction when the blocking symbol lock is available at the beginning of an instance of execution of the instruction, the blocking-symbol lock not being addressable by user software, containing in the instruction: a test-location operand for addressing a test location in the resource, a comparative operand for storing a comparative value taken from the test location, and one or more utilization operand(s) for using the resource during the instance, the operands being only accessible to the executing processor, setting addresses and values for the operands, including placing a comparative value into the comparative operand from the test location, prior to execution of an instance of execution of the instruction, initiating the instance by obtaining the blocking symbol lock, when available, and accessing the test location to fetch therefrom a test value, and during the instance comparing the test value and the comparative value to determine if they have a compare equal condition or a compare unequal condition, ending the instance in an uncompleted state if the compare unequal condition is obtained by placing the current test value from the test location into the comparative value for preparing for a later execution instance of the instruction, and setting the blocking symbol lock to available state to make the lock available to other blocking symbol instances executed by the processors in the system, and completing the instance if the compare equal condition is obtained by accessing one or more resource locations in the resource at the address(es) of the one or more utilization operand(s) to complete the performance of the function defined by the function code, and setting the blocking symbol lock to available state to make the lock available to other blocking symbol instances executed by the processors in the system, whereby the blocking symbol and compare equal condition provide two levels of data integrity protection for resource data during the instance.

2. A method of performing an instance of execution of a resource-accessing instruction as defined in claim 1, the enabling step further comprising:

loading during the instance a resource value to one utilization operand from a location in the resource specified by another utilization operand of the instruction to perform a compare and load function under the protection of the blocking symbol.

3. A method of performing an instance of execution of a resource-accessing instruction as defined in claim 2, the method further comprising:

obtaining operands of the instruction for specifying values and addresses in general purpose registers of the executing processor, the general purpose register not being accessible by any other processor in the system.

4. A method of performing an instance of execution of a resource-accessing instruction as defined in claim 2, the method further comprising:

obtaining operands of the instruction for specifying values and addresses in a storage area accessible by the executing processor and not accessible by any other processor in the system to protect the integrity of the operands of the blocking-symbol instruction while they are being prepared by the processor for executing the blocking-symbol instruction.

5. A method of performing an instance of execution of a resource-accessing instruction as defined in claim 2, the method further comprising:

indicating a replacement value in the utilization operand in the instruction containing a predetermined value to be stored in the resource at the location in the test-location operand, and changing the resource during the instance when the compare equal condition is obtained by storing the replacement value in the resource location addressed by the test-location operand, wherein the instance performs a compare and swap function operating under the protection of the blocking symbol.

6. A method of performing an instance of execution of a resource-accessing instruction as defined in claim 5, the method further comprising:

further containing in the instruction: a second test-location operand (for addressing a second test location in the resource), a second comparative operand (to contain a second test value taken from the second test location), and a second utilization operand (to locate a second replacement value), initially setting the operands prior to initiating execution of the instance by loading the second comparative operand from the second test location in the resource, and comparing the second comparative value and a new test value taken from the resource at the second test location during the instance, and determining if a second compare equal condition, or an unequal condition, is obtained between the second comparative value and the new test value, ending the instance in an uncompleted state if the second compare unequal condition is obtained by placing the second test value from the second test location into the second comparative value for preparing for a later execution instance of the instruction, and setting the blocking symbol lock to available state to make the lock available to other blocking symbol instances by the processors in the system, indicating a double equal compare condition when the second compare condition and the previously-defined compare equal condition are both obtained during the instance, also changing the resource during the instance when the double equal condition is obtained by storing the second replacement value into the resource address specified by the second test-location operand, and setting the lock to available state at the end of the instance for completing a double compare and swap function operating under the protection of the blocking symbol that maintains the integrity of the data in the resource while storing in two resource locations which may be in noncontiguous, or contiguous, elements of the resource.

7. A method of performing an instance of execution of a resource-accessing instruction as defined in claim 5, the method further comprising:

initially setting a utilization operand pair prior to execution for the instance, comprising: storing a new value in a value-utilization operand (to be later stored in the resource), and a resource address in a location-utilization operand (for addressing a location in the resource to be changed during the instance), and also changing the resource during the instance when the compare equal condition is obtained by storing the value contained in the value-utilization operand into the resource location addressed by the location-utilization operand, wherein the instance performs a compare and swap and store function under the protection of the blocking symbol that maintains the integrity of the data in the resource while storing in plural resource locations which may be in noncontiguous, or contiguous, elements of the resource.

8. A method of performing an instance of execution of a resource-accessing instruction as defined in claim 7, the method further comprising:

initially setting a second utilization operand pair prior to executing the instance comprising a second value-utilization operand (to be stored in the resource), and a second location-utilization operand (addressing another location in the resource to be changed during the instance), and further changing the resource during the instance when the compare equal condition is obtained by storing the value contained in the second value-utilization operand into the second resource location addressed by the second location-utilization operand, wherein the instance performs a compare and swap and double store function under the protection of the blocking symbol for maintaining the integrity of the data during the instance even though the changes are made at anywhere in the resource.

9. A method of performing an instance of execution of a resource-accessing instruction as defined in claim 8, the method further comprising:

initially setting a third utilization operand pair prior to executing the instance comprising: a third value-utilization operand (to be stored in the resource), and a third location-utilization operand (addressing another location in the resource to be changed during the instance), and further changing the resource during the instance when the compare equal condition is obtained by storing the value contained in the third value-utilization operand into a third resource location addressed by the third location-utilization operand, wherein the instance performs a compare and swap and triple store function under the protection of the blocking symbol that maintains the integrity of the data in the resource while storing in plural resource locations anywhere in the resource.

10. A method of performing an instance of execution of a resource-accessing instruction as defined in claim 5, the method further comprising:

initatly setting prior to executing the instance a plurality of utilization operand pairs, each pair comprising: a value-utilization operand (to be stored in the resource), and a location-utilization operand (addressing a location in the resource to be changed during the instance), and also when the compare equal condition is obtained during the instance changing the resource at a distinct location in the resource for each operand pair by storing a value contained in the value utilization operand of each pair into a respective resource location addressed by the location-utilization operand in the same pair, wherein the instance changes as many distinct locations as there are operand pairs to perform a blocking-symbol compare and swap and multiple store function that maintains the integrity of the data during the instance regardless of where the locations exist in the resource.

11. A method of performing an instance of execution of a resource-using instruction as defined in claim 1, the method further comprising:

storing a queue representing the resource comprising a queue anchor and any number of queue elements which may be located anywhere in the shared memory, in which one or more of the queue anchor and queue elements can be changed during an instance of performance by any blocking-symbol instruction even though changes are made in disjoint elements of the queue.

12. A method of performing an instance of execution of a resource-using instruction as defined in claim 2, the method further comprising:

executing a program containing one or more blocking symbol instructions for scanning a queue containing a queue anchor and any number of queue elements, scanning each element in the queue beginning at the queue anchor, each element containing a next pointer value at a predefined location for locating a next element to be scanned in the queue, initially setting a test-location operand in the blocking symbol instruction to locate a test location in the queue from which to fetch a test value at the beginning of each scan for indicating if the queue has been changed since beginning a scan, generating a compare equal condition during an instance of execution of the blocking symbol instruction to assure the queue has not changed during the scan if the test value has not changed during the scan, and generating a compare unequal condition if the test value has changed, ending the scan and beginning a new scan if the compare unequal condition is found, and continuing the scan if the compare equal condition is obtained by the instance loading a utilization operand with a next element pointer value from a queue element being examined.

13. A method of performing an instance of execution of a resource-using instruction as defined in claim 2, the method further comprising:

executing a program containing one or more blocking symbol instructions for scanning a queue containing a queue anchor and any number of queue elements, scanning each element in the queue beginning at the queue anchor, each element containing a next pointer value at a predefined location for locating a next element to be scanned in the queue, initially setting a test-location operand in the blocking symbol instruction to locate a test location in the queue from which to fetch a test value at the beginning of each scan for indicating if the queue has been changed since beginning a scan, generating a compare equal condition during an instance of execution of the blocking symbol instruction to assure the queue has not changed during the scan if the test value has not changed during the scan, and generating a compare unequal condition if the test value has changed, ending the scan and beginning a new scan if the compare unequal condition is found, and continuing the scan if the compare equal condition is obtained by the instance loading a utilization operand with a next element pointer value from a queue element being examined.

14. A method of performing an instance of execution of a resource-using instruction as defined in claim 2, for adding a new element to the top of a queue (resource), the method further comprising:

creating a new element in memory, obtaining operands of an instance of execution of a blocking symbol compare and swap instruction: including a replacement operand, a test-location operand and a comparative value operand, loading a location address of the new element into the test-location operand, placing into the comparative operand a test value taken from the resource location addressed by the test-location operand, and setting the replacement operand to the address of the new element, initiating the instance by obtaining the blocking symbol lock, when available, and accessing the test location to fetch therefrom a test value, and during the instance comparing the test value and the comparative value to determine if they have a compare equal condition or a compare unequal condition, ending the instance in an uncompleted state if the compare unequal condition is obtained by placing the current test value from the test location into the comparative value for preparing for a later execution instance of the instruction, and setting the blocking symbol lock to available state to make the lock available to other blocking symbol instances executed by the processors in the system, and completing the instance if the compare equal condition is obtained by storing the value of the replacement operand into the address located by the test-location operand to insert the new element at the top of the queue to complete the performance of the function defined by the function code in a single instance, and setting the blocking symbol lock to available state at the end of the instance to make the lock available to other blocking symbol instances executed by the processors in the system, whereby the new element is now part of the queue.

15. A method of performing an instance of execution of a resource-using instruction as defined in claim 2, for adding a new element to the bottom of a queue (resource), the method further comprising:

creating a new element in memory to be added to a queue (resource), obtaining operands of an instance of execution of a blocking symbol compare and swap and store instruction by including: a replacement operand, a test-location operand and a comparative value operand, and a first utilization operand pair comprising a first value-utilization operand and a first location-utilization operand, loading a location address of the new element into the test-location operand, placing into the comparative operand a test value taken from the resource location addressed by the test-location operand, setting the replacement operand to the address of the new element, placing the address of the new element into the first value-utilization operand, and setting the first location-utilization operand to the address of a next element pointer in the last queue element, initiating the instance by obtaining the blocking symbol lock, when available, and accessing the test location to fetch therefrom a test value, and during the instance comparing the test value and the comparative value to determine if they have a compare equal condition or a compare unequal condition, ending the instance in an uncompleted state if the compare unequal condition is obtained by placing the current test value from the test location into the comparative value for preparing for a later execution instance of the instruction, and setting the blocking symbol lock to available state to make the lock available to other blocking symbol instances executed by the processors in the system, and completing the instance if the compare equal condition is obtained by: storing the value of the replacement operand into the address located by the test-location operand to insert the new element at the bottom of the queue, storing the first value-utilization operand into the address in the last element located by the first location-utilization operand to insert the new element into the queue, and setting the blocking symbol lock to available state at the end of the instance to make the lock available to other blocking symbol instances executed by the processors in the system.

* * * * *